Aug. 6, 1935.  P. B. HOYE  2,010,544
CONNECTER
Filed Aug. 4, 1932   12 Sheets-Sheet 3
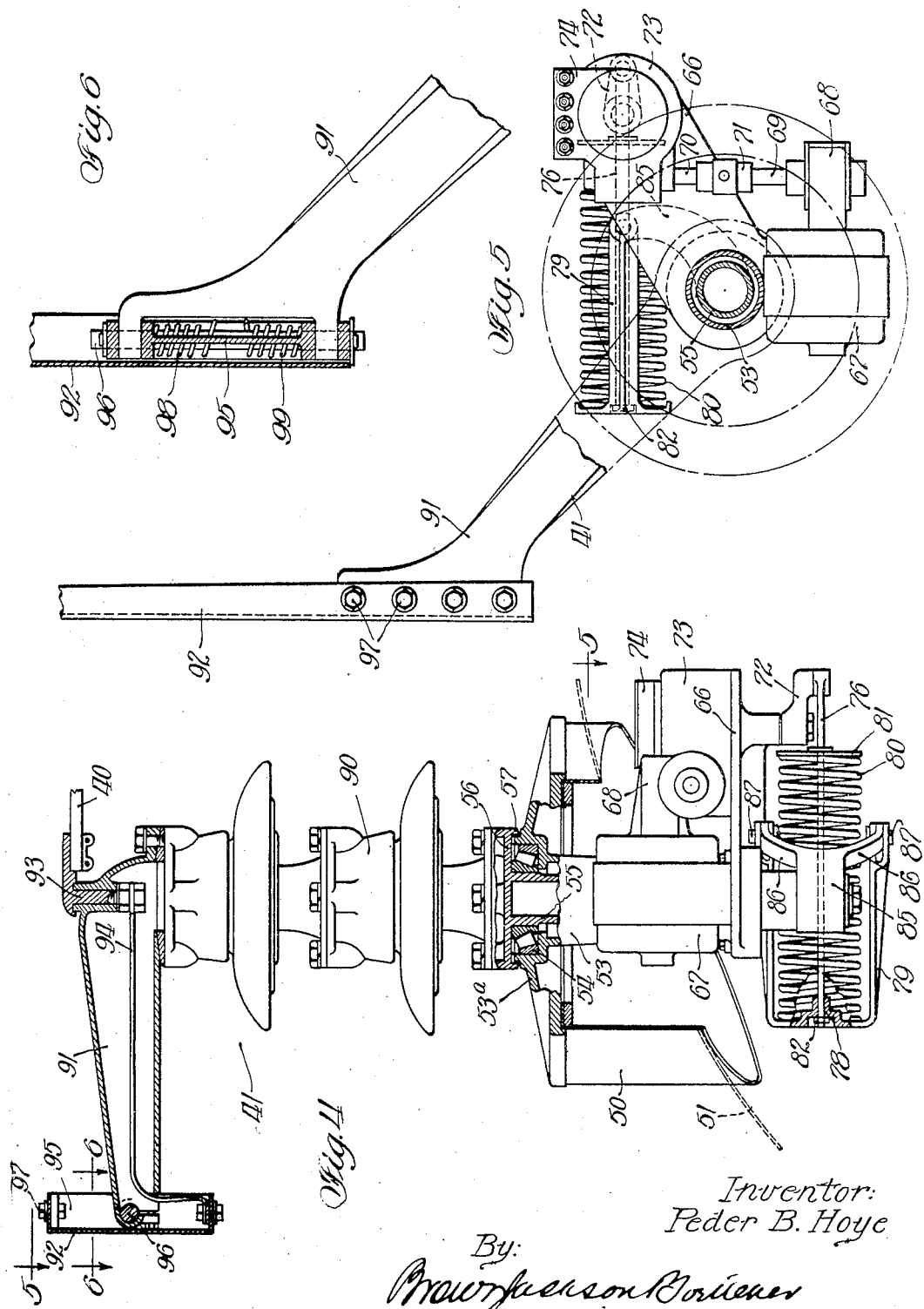
Inventor:
Peder B. Hoye

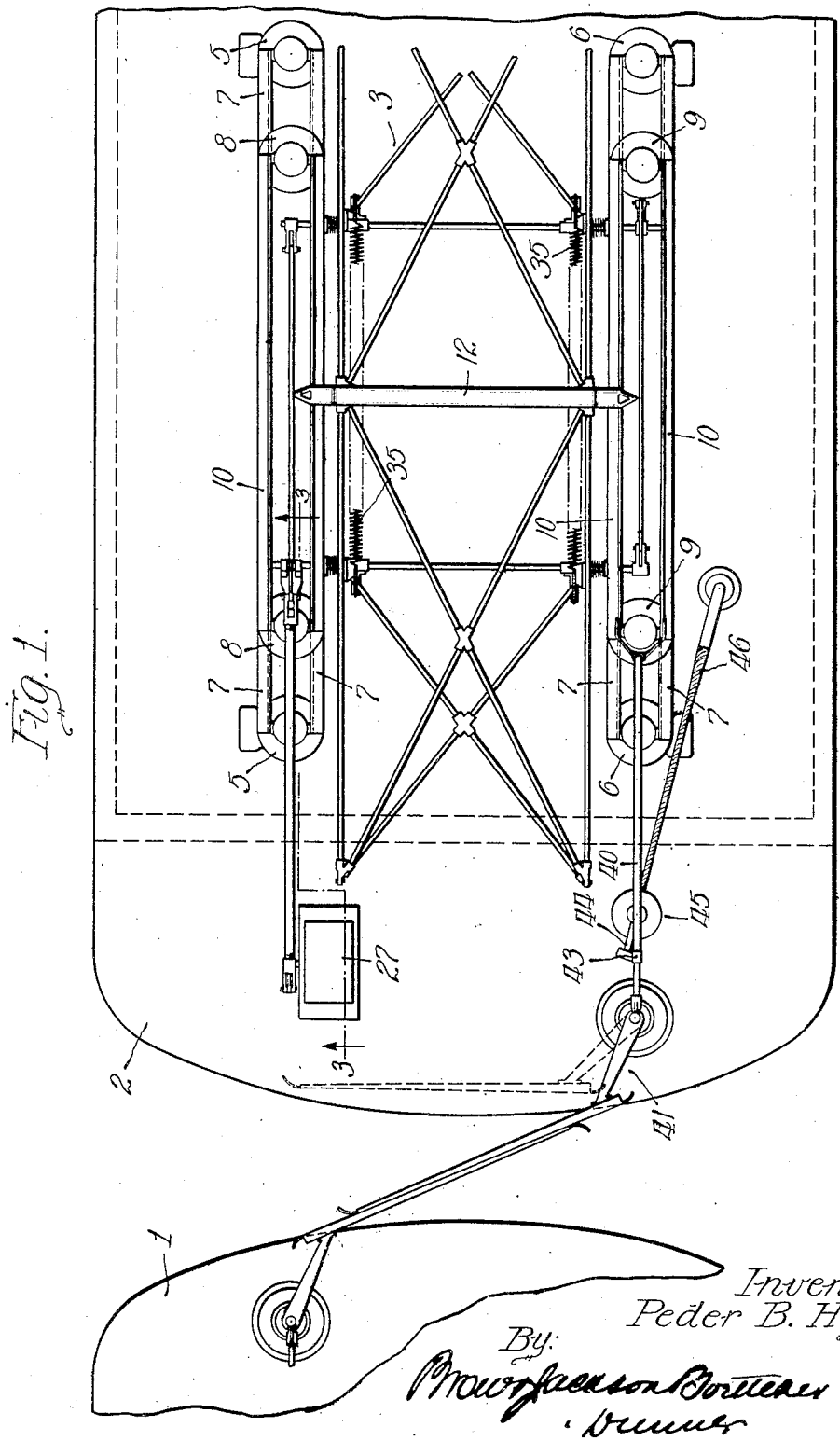

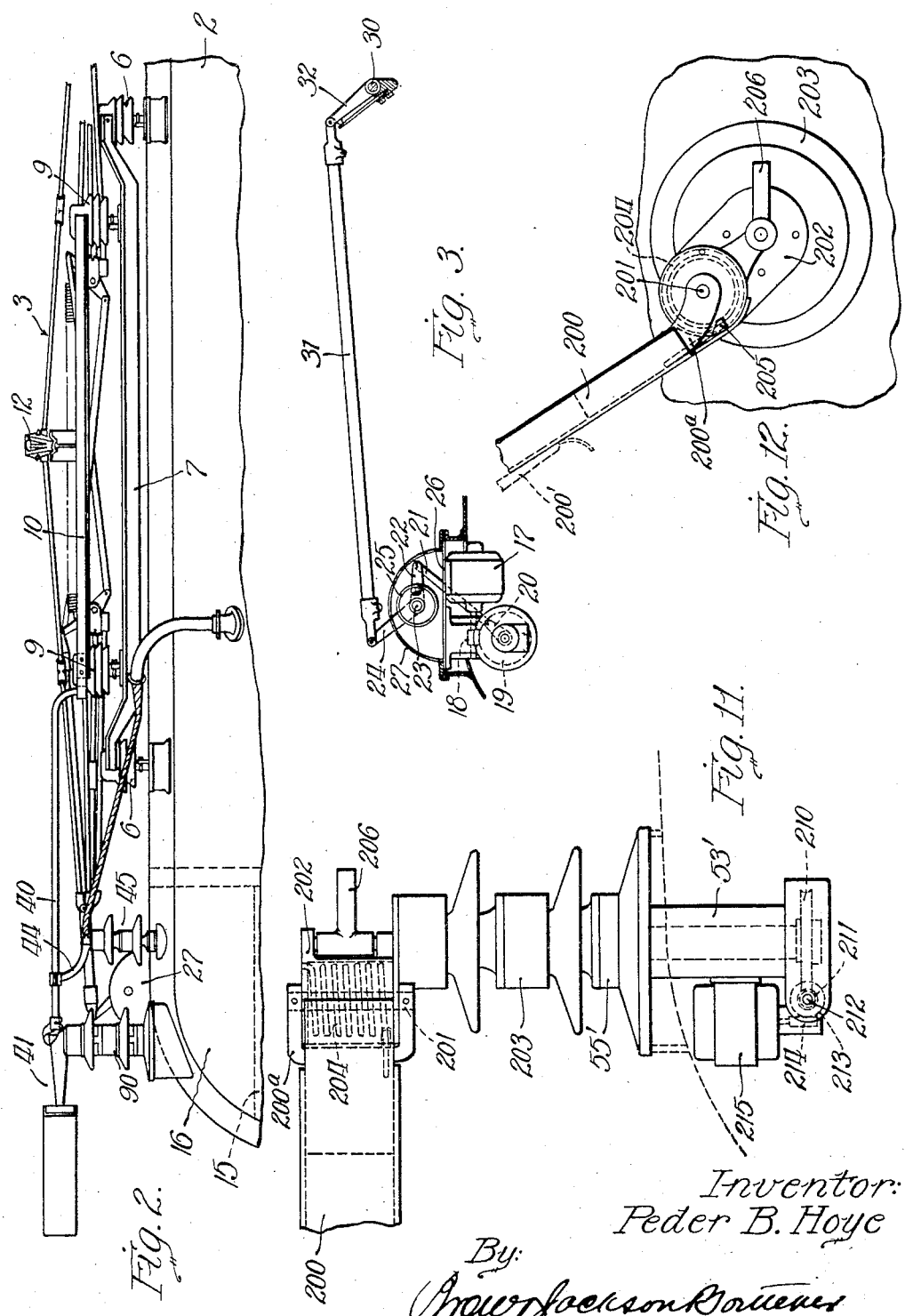

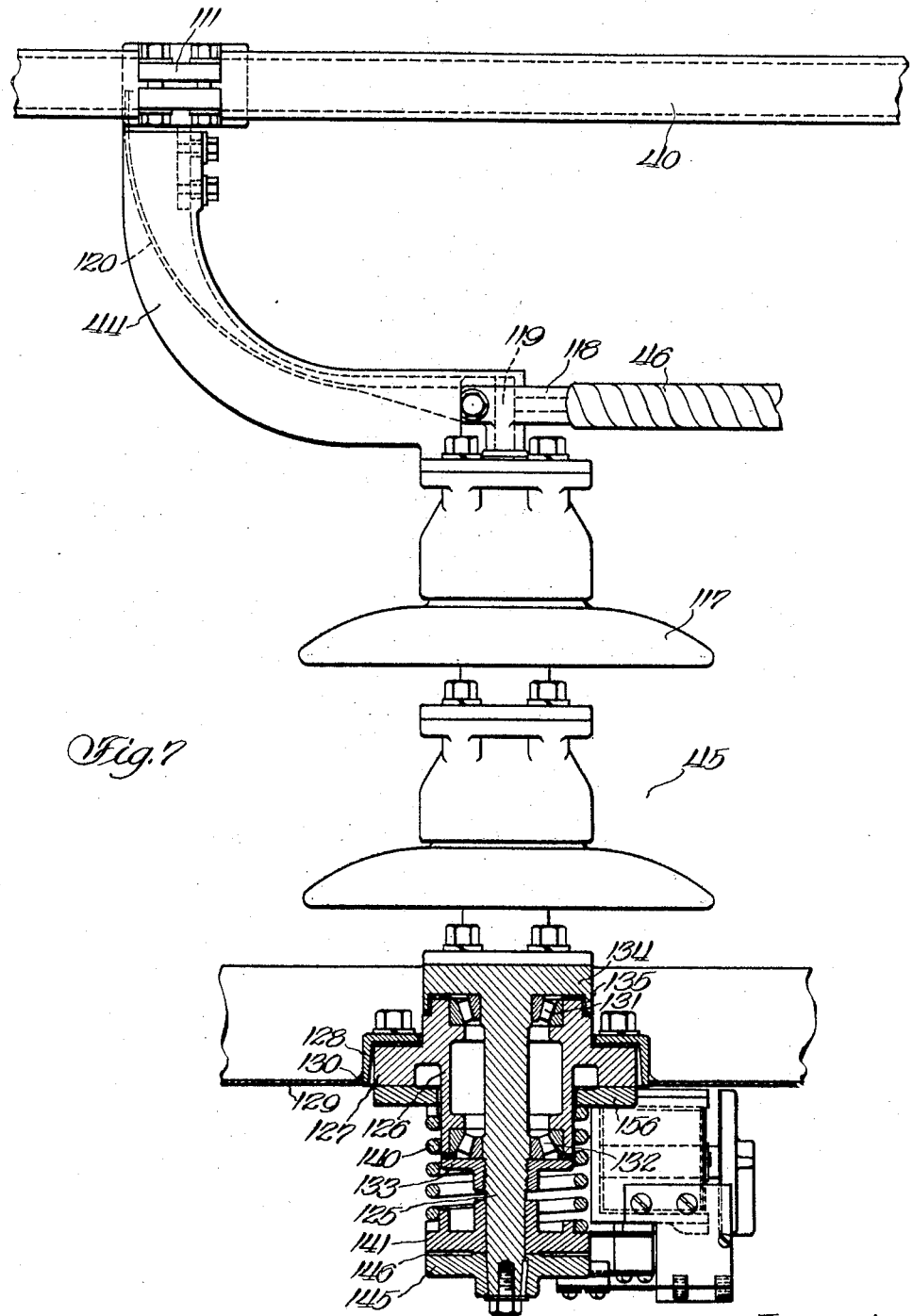

Aug. 6, 1935.  P. B. HOYE  2,010,544
CONNECTER
Filed Aug. 4, 1932  12 Sheets-Sheet 5
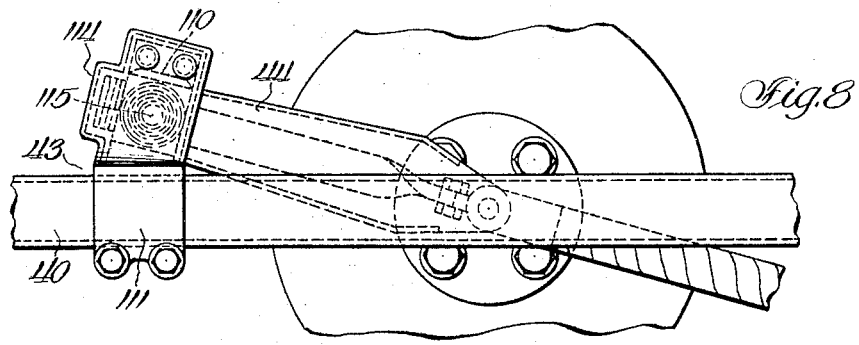
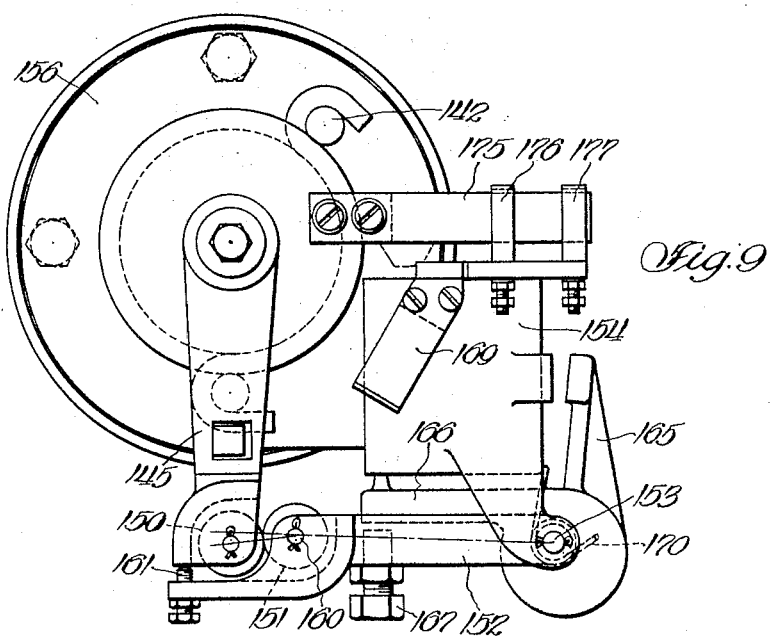
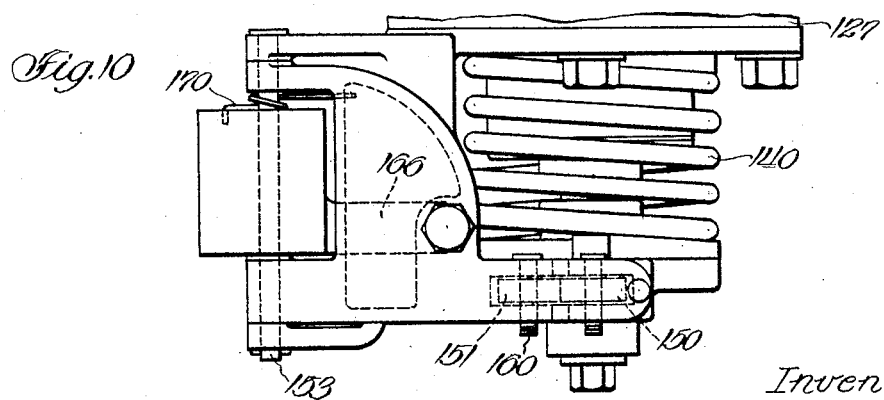
Inventor:
Peder B. Hoye Aug. 6, 1935.   P. B. HOYE   2,010,544
CONNECTER
Filed Aug. 4, 1932   12 Sheets-Sheet 6

Inventor:
Peder B. Hoye
By:
Attys.

Aug. 6, 1935. P. B. HOYE 2,010,544
CONNECTER
Filed Aug. 4, 1932 12 Sheets-Sheet 7

Inventor:
Peder B. Hoye

Aug. 6, 1935.  P. B. HOYE  2,010,544
CONNECTER
Filed Aug. 4, 1932    12 Sheets-Sheet 8
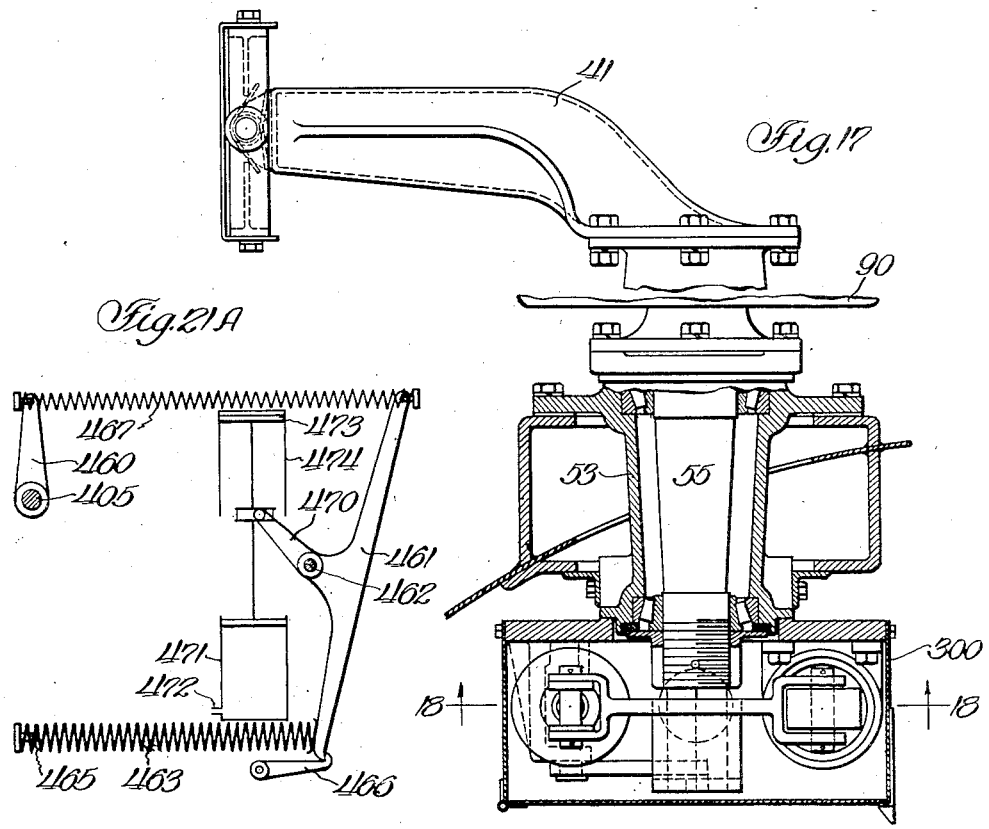
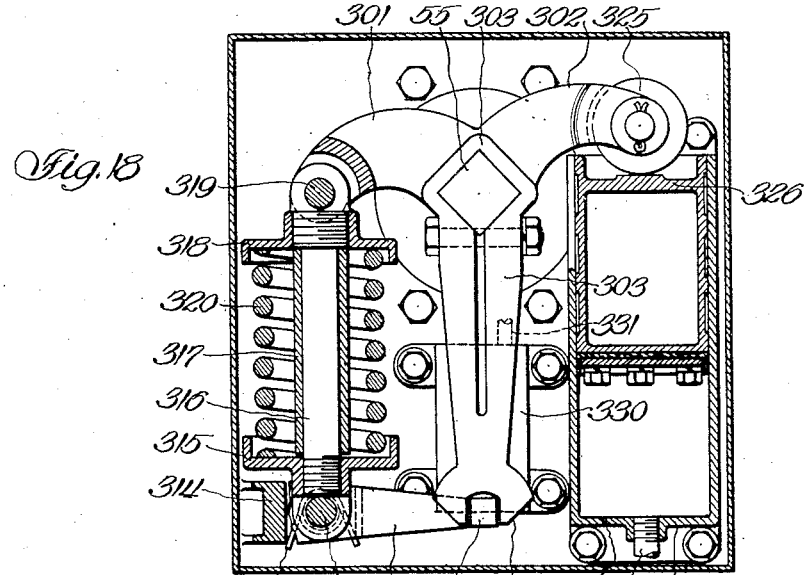
Inventor:
Peder B. Hoye
By: Brown Jackson & Brenner
Brenner Attys.

Aug. 6, 1935.  P. B. HOYE  2,010,544
CONNECTER
Filed Aug. 4, 1932  12 Sheets-Sheet 9
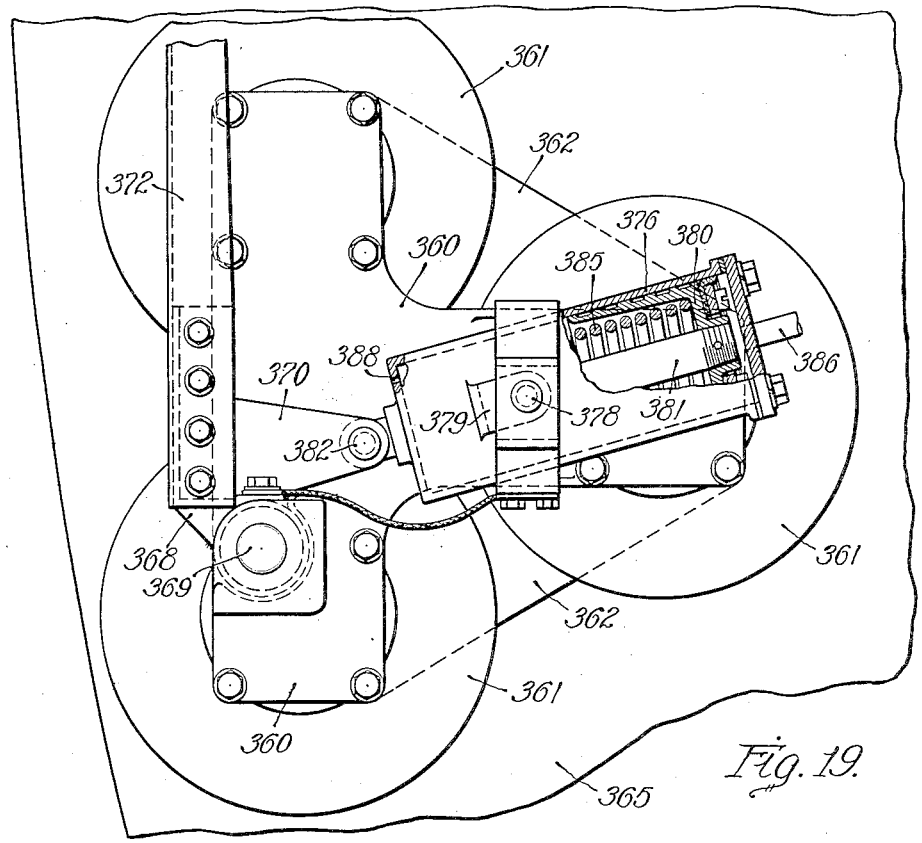
Fig. 19.
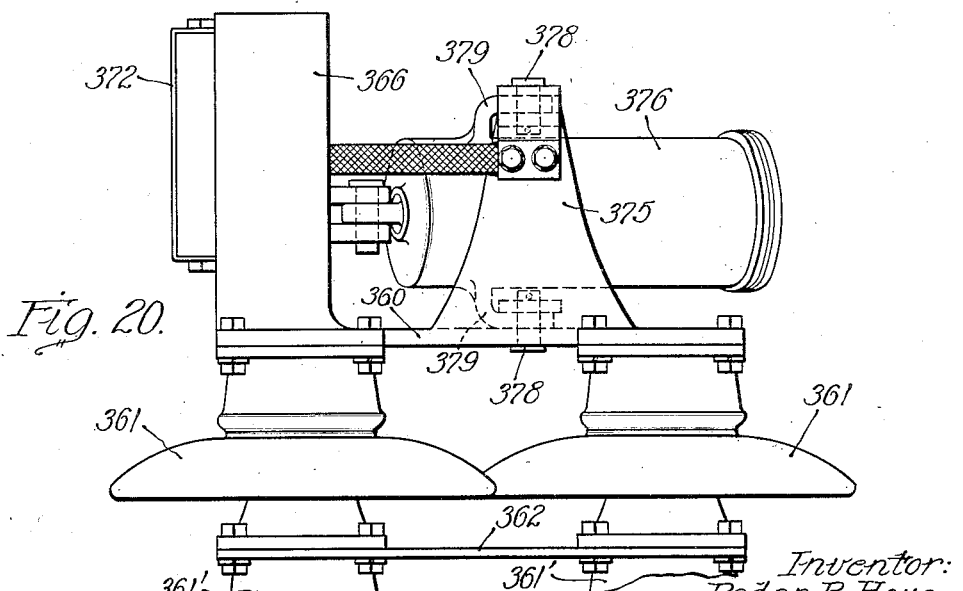
Fig. 20.
Inventor:
Peder B. Hoye
Attys.

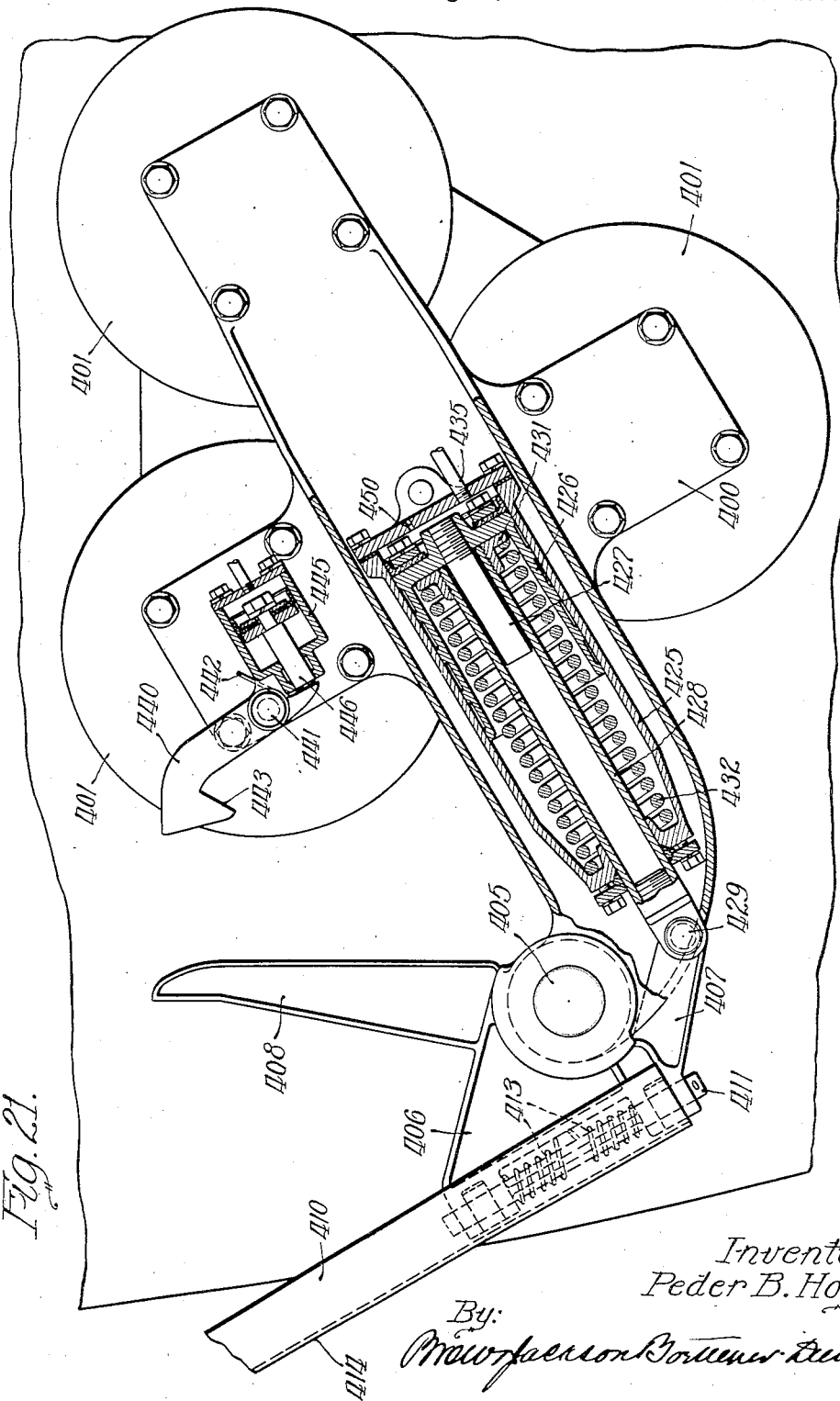

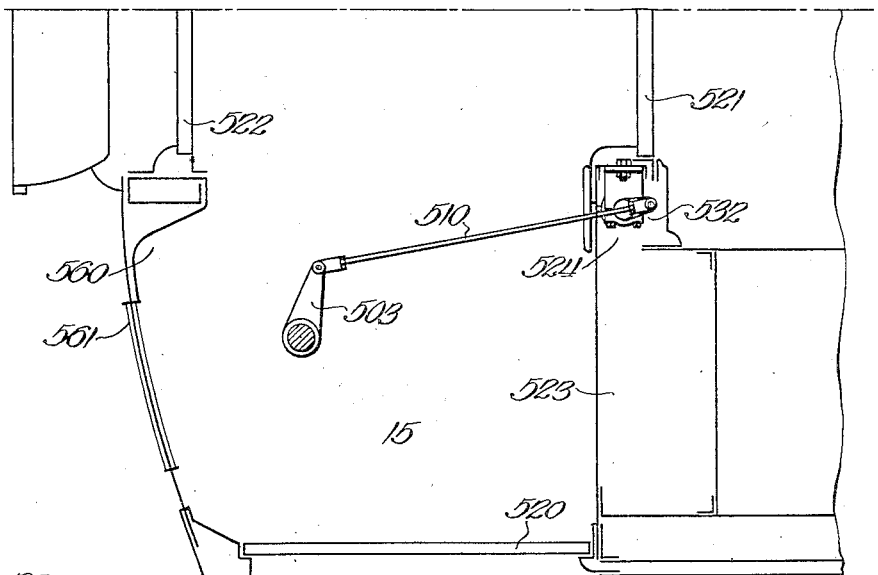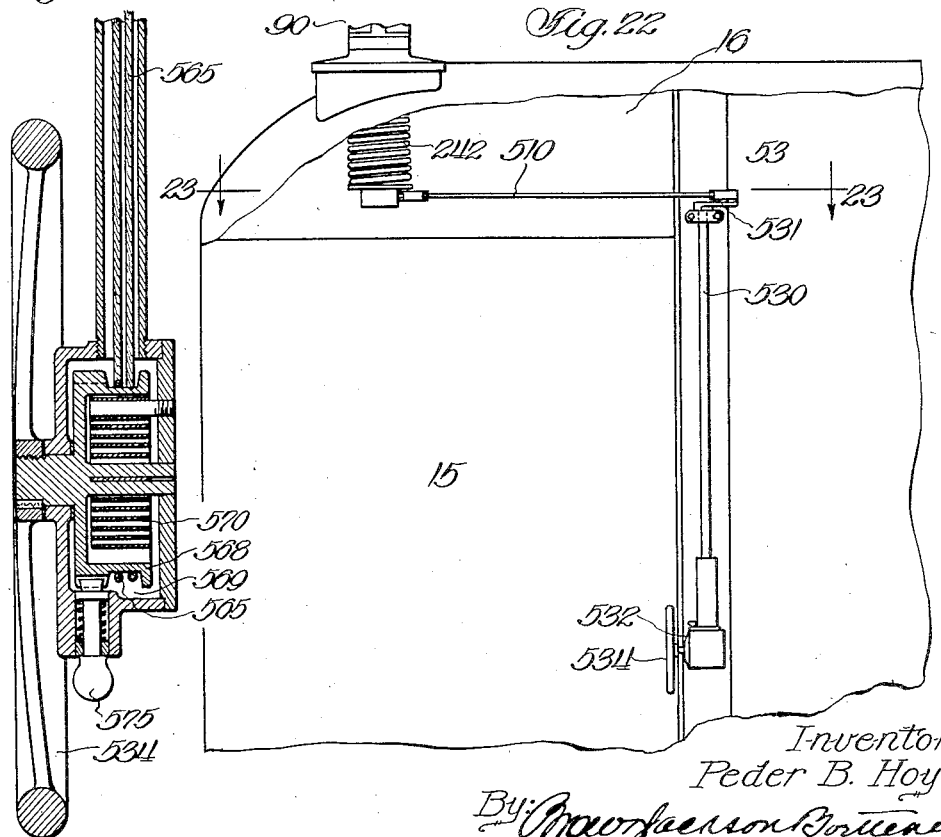

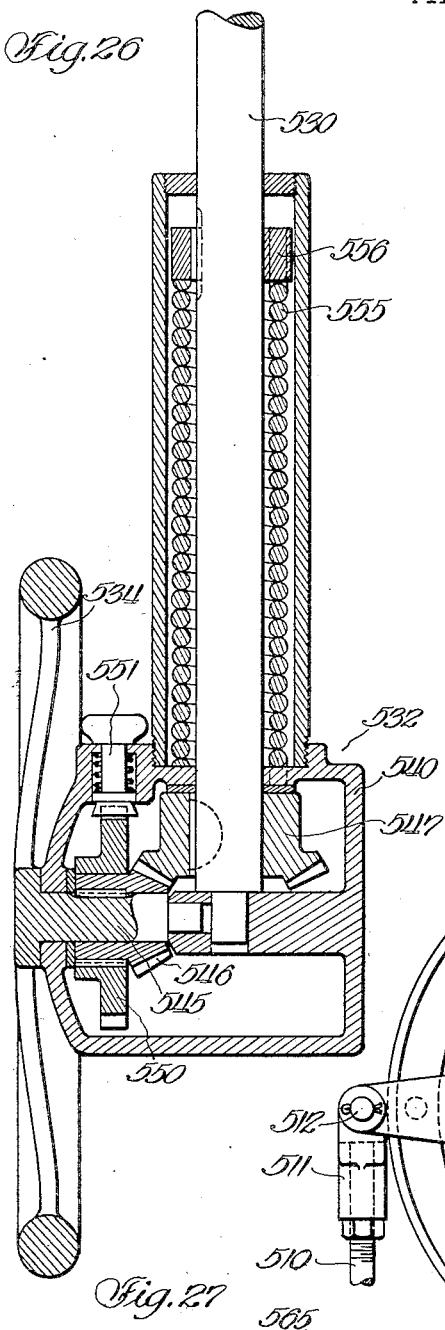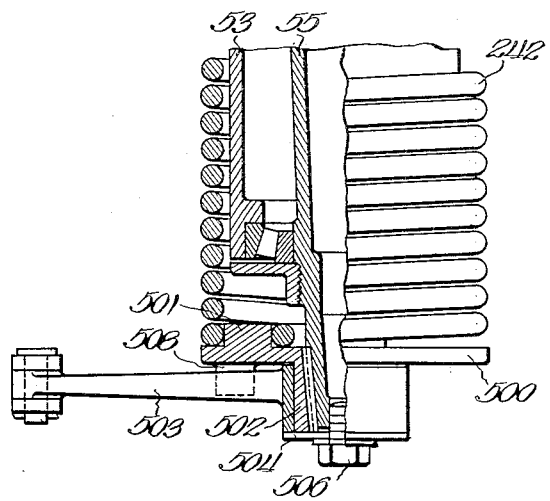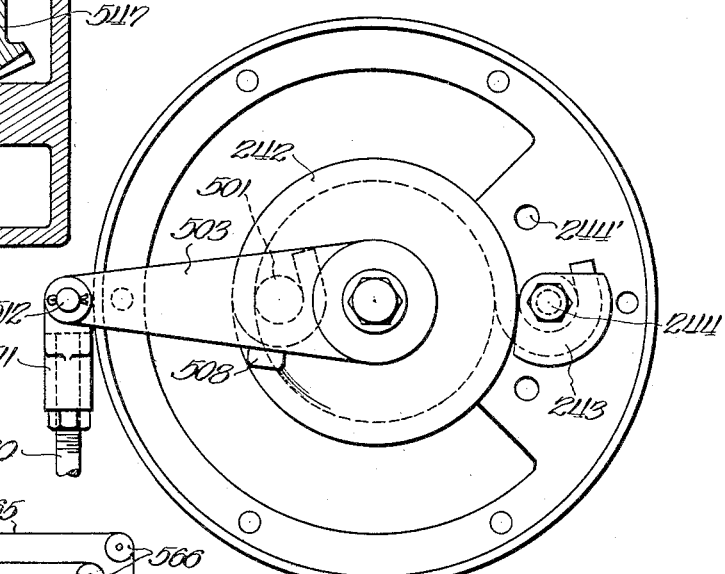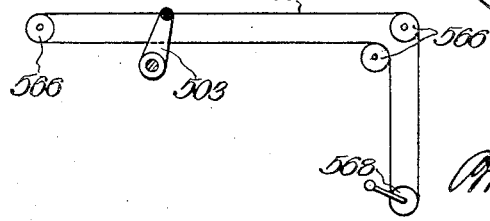

UNITED STATES PATENT OFFICE 2,010,544

CONNECTER

Peder B. Høye, Maywood, Ill., assignor to Electrical Engineers Equipment Co., Melrose Park, Ill., a corporation of Illinois Application August 4, 1932, Serial No. 627,418

25 Claims. (Cl. 173—332)

The present invention relates to switching means in general, and more particularly to switching means controlling the power circuit of electric vehicles. In its more specific aspect, the present invention is particularly concerned with power switching means for use on vehicles of the type that obtain their electric power from a trolley.

It is one of the objects of the present invention to provide an improved switching arrangement between tandem connected vehicles of a train.

It is a further object of the present invention to provide an improved switch that can be mounted on, and adjacent one end of, the roof of a vehicle, such as a railway car, and which will cooperate with a similar switch similarly mounted on an adjacent car and maintain electrical connections while the train is in motion. Such a switch must satisfy certain rigorous requirements. There is a certain amount of relative movement between adjacent cars of a railroad train, especially as the train moves along a curve. If a switch is so designed that one part of the contact mechanism is mounted on one of the cars and the other part on the other car, then the construction of the switch must be such that contact is maintained between the cooperating switch parts while the train is in motion, and the switch supports upon which the cooperating contact making parts are mounted go through all the relative motions corresponding to the motions of the respective cars. This means that the switches must be yieldingly maintained in contact while permitting a movement of the respective switches with regard to their supports. It is one of the prime objects of the present invention to provide such a switch wherein the number of parts that must partake of the movement of the switch blade, due to the movement of the vehicle, are reduced to a minimum. In order to accomplish this end, I provide, in one embodiment of my invention, an arrangement whereby, when the switch is in its closed position, the switch operating mechanism may remain stationary while permitting the blade to be moved towards its open position by the action of the cooperating blade of the switch on the adjacent car of the train. Spring means is provided for returning the blade to its normal position upon release of the force that caused the movement towards the open position, said spring means serving to maintain the necessary contact pressure between the cooperating contacting switch blades. Various structural arrangements may be provided for accomplishing this result, and it is to be understood that this invention is not limited to the several different embodiments herein illustrated. In one embodiment of my invention this is accomplished by an arrangement wherein an electric motor drives a cam through suitable step-down gearing, and said cam is arranged to force the switch blade to its open position against the action of a spring which urges the blade to its closed position. To close the switch the cam is retracted from its switch open holding position to permit the spring to actuate the switch to its closed position. Thereafter, the cam being out of the way, the switch may be moved towards its closed position by external forces if such forces exist. The retraction of the cam may be brought about in any preferred manner, as by bodily removing the cam, or by shaping the cam so that upon turning thereof it permits movement of the blade under the action of the spring. Any other suitable means other than a cam for example, a crank, may be used.

In another embodiment of my invention this result is obtained by providing a pneumatic motor for moving the switch to its open position, against the closing action of the spring, and providing an arrangement whereby the operating portion of the motor, such as the piston, or the pneumatic diaphragm, may remain in its normal position while permitting a retraction of the blade towards the open position by external forces. This is accomplished by providing a sliding connection between certain of the parts.

It is a further object of the present invention to provide a switching arrangement wherein the switch operating mechanism is mounted below the roof of the vehicle, whereby the same is not only protected from weather but also against injury by and interference with workmen who must, occasionally, mount on the roof of the car. Railway cars are generally provided with a vestibule at each end thereof. A vestibule hatch is located between the ceiling of the vestibule and the roof of the car. Generally, this hatch is not utilized, but represents merely so much waste space. I propose to mount the switch operating mechanism within this space. If the vestibule is not provided with a ceiling, suitable guards or a casing, such as a sheet iron box, or other means, can be used to protect the mechanism from unauthorized access or interference. In the preferred embodiment of my invention the switch operating mechanism is insulated from the switch itself and is at the potential of the car, which is at ground potential.

It is a further object of the present invention to provide an improved switch that is particularly adapted for mounting on a railway car and wherein the motor operating mechanism, gearing, springs, etc. are all mounted as a compact assembly on the bearing shell that supports the rotatable switch supporting insulator.

It is a still further object of the present invention to provide a switching arrangement for railway vehicles, wherein the circuit connections from car to car are independent of the various power connections within the car. In addition to the switching means for extending a circuit from car to car, I provide switching means on the roof of the car for extending a circuit from the live apparatus on the roof of the car to the apparatus within the car. This last mentioned switching means may be operated to isolate, electrically, the apparatus within the car, without affecting the circuit connections between the cars of the train.

In those installations where the switches are controlled by a pneumatic motor the preferred arrangement is such that the switch is urged to its closed position by a spring and is moved to its open position by the application of pneumatic pressure. When the switch reaches its full open position it is latched therein. It is one of the objects of the present invention to provide an arrangement wherein the pneumatic motor places the switch operating spring under stress, so that it may operate the switch at a later time, even though there is no air pressure available. A mere release of the latch will release the spring so that it may actuate the switch to its closed position. The spring must necessarily be of a considerable power, and therefore there is a danger that it may operate the switch violently. To prevent such action I provide an arrangement wherein the piston constitutes a dash pot.

It is a still further object of the present invention to provide a novel and improved operating mechanism for switches of the class described, whereby the same may be readily operated manually without requiring the exertion of an undue amount of effort on the part of the operator. I accomplish this end by providing an auxiliary spring, of a tension preferably about one-half of the tension of the switch operating spring, and arranged to assist the operator in overcoming the tension of the main spring during operation of the switch in one direction, and out of interfering relation with the switch during operation thereof in the other direction.

The attainment of the above and further objects of the present invention will be apparent from the following specification taken in conjunction with the accompanying drawings forming a part thereof.

In the drawings:

Figure 1 is a fragmentary plan view of two adjacent cars of a railway train, said cars being equipped with switches embodying my invention;

Figure 2 is a fragmentary side view of one of the cars shown in Figure 1;

Figure 3 is a sectional view taken along the line 3—3 of Figure 1;

Figure 4 is a side view, in partial section, of the bus coupling switch shown in Figures 1 and 2;

Figure 5 is a sectional view taken along the line 5—5 of Figure 4 and looking in the direction of the arrows;

Figure 6 is a fragmentary sectional view taken along the line 6—6 of Figure 4;

Figure 7 is a side view, in partial section, showing the automatic transformer cut-out switch of Figure 1;

Figure 8 is a plan view of the switch shown in Figure 7;

Figure 9 is a bottom view of the switch shown in Figure 7;

Figure 10 is a side view of the operating mechanism of the switch shown in Figure 7, said view being taken at right angles to the section of Figure 7;

Figure 11 is a side view of another form of bus coupling switch;

Figure 12 is a plan view of the switch shown in Figure 11;

Figure 17 is a side view, in partial section, of a bus coupling switch operated by a pneumatic motor;

Figure 18 is a sectional view taken along the line 18—18 of Figure 17 and looking in the direction of the arrows;

Figure 19 is a fragmentary plan view, in partial section, of a modified form of pneumatic operated bus coupling switch;

Figure 20 is a side view of the switch shown in Figure 19;

Figure 21 is a fragmentary plan view, in partial section, of still another bus coupling switch embodying the principles of my invention;

Figure 21a is a diagrammatic view of a modification of the mechanism shown in Figure 21;

Figure 22 is a view through a portion of the end of a railway car, and illustrating a hand operating arrangement for my improved bus coupling switch;

Figure 23 is a sectional view taken along the line 23—23 of Figure 22;

Figure 24 is a fragmentary sectional view of a portion of a bus coupling switch adapted for hand operation;

Figure 25 is a bottom view of the switch shown in Figure 24;

Figure 26 is a longitudinal sectional view of one form of hand operating mechanism;

Figure 27 is a diagrammatic view of a rope drive for a manually operated switch; and Figure 28 is a longitudinal sectional view of a hand operating mechanism suitable for use with a rope drive.

Figure 13:
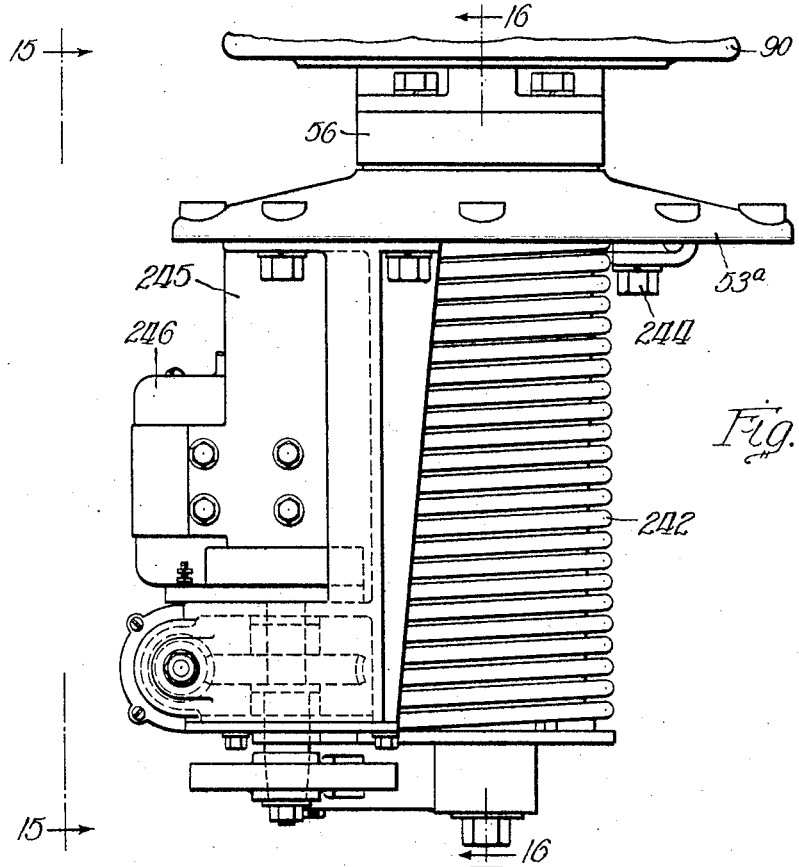
Figure 13 is a side view illustrating another embodiment of a mounting and operating mechanism for a bus coupling.

Reference may now be had more particularly to Figures 1 and 2, wherein there is shown the adjacent ends of two coupled railway cars upon which my improved mechanism is mounted. The railway cars are indicated at 1 and 2, and may be coupled together in any preferred manner. Since the coupling means between the two cars constitutes no part of my present invention, it has been omitted from the drawings. A pantograph structure 3, of the usual type, is mounted upon the top of the vehicle 2, as by means of four insulators 5—5 and 6—6 that support angle members 7—7 upon which are mounted insulators 8—8 and 9—9 that support angle members 10—10 upon which the pantograph is mounted. The pantograph includes the usual trolley shoe 12. The linkage comprising the pantograph is of a known construction, and does not, per se, constitute a part of the present invention. However, insofar as I am aware, such pantographs have always been operated by pneumatic motors that were in conductive relation to the pantograph and therefore insulated from the car roof. Also, the hose or the like for supplying air pressure to the pneumatic motor had to be provided with an insulating section, since the motor end of this hose was at trolley potential when the pantograph shoe was in contact with the trolley. I propose to depart from this practice by using an electric motor for actuating the pantograph, and propose to connect the motor with the pantograph by means of an insulating rod, so that the motor itself may be at ground potential even while the pantograph is in contact with a trolley.

Passenger railway cars are usually provided with a vestibule at each end thereof, and there is provided a vestibule hatch between the ceiling the vestibule and the roof of the vehicle. I propose to mount the pantograph operating motor and associated speed reducing gearing and limit switches in the vestibule hatch. In Figure 2 the vestibule is indicated at 15, and the vestibule hatch at 16. The mechanism for operating the pantograph is shown more particularly in Figure 3, and comprises a motor 17 that drives a worm 18 which is in mesh with a worm wheel 19 to which is secured a crank 20 that operates a connecting rod 21. The crank 20 is operated by the motor 17 always in the same direction and makes approximately one-half revolution to move the pantograph into or out of engagement with the trolley. The connecting rod 21 is pinned to a crank 22 that rotates about a center 23 about which also turns a crank 24. The cranks 22 and 24 are connected together by a torsion spring 25 so as to permit relative movement between them. The motor and its associated speed reducing gearing are suspended in the vestibule hatch from a plate member 26 that is suitably secured to the roof of the car. A cover member 27 affords a closure for the opening into which this apparatus extends. The crank 24 is connected to an operating shaft 30 of the pantograph structure by means of a rod 31 and a crank 32. The rod 31 may be made of any suitable insulating material, such as the material commercially known as "bakelite". The pantograph is adapted to be moved out of engagement with the trolley by the motor mechanism described, and is adapted to be moved into engagement with the trolley by a spring 35 when the motor mechanism is operated to move the crank 24 to the right, as seen in the drawings, to permit such closing movement of the pantograph.

The circuit from the contact shoe 12 of the pantograph extends along the links of the pantograph, in the usual manner, to a bus 40. The bus 40 comprises a pipe of copper or other suitable conducting material, and is mounted at one end of the angle members 10—10 that support the pantograph, and at its other end upon a bus coupling switch 41. A conductor, or bus similar to the bus 40, extends the circuit from the pantograph to a bus coupling switch similar to the switch 41 and located at the opposite end of the railway car 2. The two switches at the respective ends of the car are therefore connected together. The bus coupling switch is of a construction which will be more fully set forth as this description proceeds, and is adapted to cooperate with a similar switch mounted upon the adjacent car 1 of the train for extending a circuit to or from the car 1. A contact 43 is mounted directly upon the bus 40 and is adapted to be engaged by a contact mechanism on a switch arm 44 of a transformer cut-out switch 45 for establishing a circuit by way of the conductor 46 to the usual power transformer mounted within the car 2. The switches 41 and 45 are independently operable, whereby the transformer within the car may be cut into or out of circuit independently of the connection or disconnection of the switch 41 with a corresponding switch of an adjacent car. It may be seen from Figures 1 and 2 that the switches 41 and 45 are mounted on the car roof directly above the vestibule hatch. By this arrangement, the operating mechanism for these switches may be located within the vestibule hatch, in space that is otherwise not utilized.

Reference may now be had more particularly to Figures 4 and 5 showing one form of bus coupling switch. A hollow frusto-cylindrical member 50 is welded or otherwise secured to the sloping portion 51 of the car roof, being shaped at its lower end to conform with the shape of the car roof. At its upper end the portion 50 provides a horizontally extending mounting flange to which the switch supporting parts are secured. The switch mounting comprises a shell or barrel 53 having an integrally formed circular flange 53a that rests upon and is secured to the member 50. At the top of the barrel 53 there is provided a suitable bearing 54 for a spindle 55 that extends through the barrel, being supported at the bearing 54 and being maintained in a vertical position by a suitable bearing similar to the bearing 54 and located at the lower end of the shell 53. The spindle 55 is provided with a disc portion 56 having a downwardly extending peripheral flange 57 for closing off the barrel opening through which the spindle extends, and preventing the entrance of moisture or soot into the barrel. The spindle 55 is axially rotatable, in a manner to be more fully set forth presently, and comprises a support for the switch proper.

An explanation will now be given of the actuating mechanism for rotating the spindle 55 to rotate the insulator stack 60 to open or close the switch. A shelf 66 is cast integrally with the shell 53 and extends outward radially of the shell. The shelf 66 constitutes a support for the actuating mechanism of the switch. An electric motor 67 is mounted on the shelf 66 and, through a speed reducing worm gearing 68, drives a shaft 69 which is coupled to a shaft 70 by a coupling member 71. The shaft 70 drives a crank 72 through a speed reducing worm gear mechanism 73. Limit switches are mounted in a casing 74 and are driven by the gearing 73 to interrupt the motor circuit when the crank 72 has been rotated a proper amount. An operating rod 76 is pinned to the crank 72 to be actuated thereby, and at its other end extends through an opening in a boss 78 in a clevis 79. The boss 78 permits sliding movement of the rod 76 with respect to the clevis, but prevents angular movement of the rod with respect to the clevis. A compression spring 80 extends between the clevis 79 and a plate member 81 that is rigidly secured to the rod 76. A nut 82 at the end of the rod 76 limits the extent of relative sliding movement of the rod with respect to the clevis in one direction. The nut does not, however, interfere with the reverse sliding movement of the rod through the boss 78, to compress the spring. A crank 85 is keyed to the lower end of the spindle 55 for actuating the same. The crank 85 includes a pair of arms 86—86 that are pinned to the clevis by means of pins 87—87, so that movement of the clevis produces a corresponding movement of the crank 85.

The switch 41 is shown in Figures 4 and 5 in its normal open position. At this time the crank 72 and the rod 76 are on dead center, whereby the mechanism serves to lock the rod against movement to the left, as seen in Figure 5. At the nut 82 the rod 76 holds the clevis 79 against movement to the left, as seen in Figure 5, thereby holding the crank 85 against counter clockwise movement. The crank 85 is held against clockwise movement by the spring 80. It is therefore apparent that the switch 41 is maintained in its open position and is positively prevented from accidentally swinging counter clockwise towards its closed position. To close the switch, the motor 67 is actuated to actuate the crank 72. This causes the rod 76 to move to the left, as seen in Figure 5. The spring 80 forces the clevis 79 to follow the movement of the rod and pulls the crank 85 counter clockwise, as seen in Figure 5. It is to be noted that during this switch closing operation there is a resilient connection between the driving mechanism and the spindle 55, and it is through the compression of the spring 80 that the spindle is turned to its switch closed position. After the motor has rotated the crank 72 through aproximately 180 degrees, the motor circuit is opened, as by the limit switches, to leave the switch in its closed position. This position is, preferably, a few degrees farther than the position indicated in Figure 1. As the switch blade approaches its full closed position it may abut against a corresponding blade carried by a corresponding switch of the adjacent railway car. This will normally occur slightly before the crank 72 reaches its full closed position. Thereafter, as the crank 72 advances to its full switch closed position the switch blade 62 is maintained stationary by the abutting switch blade of the adjacent car, and therefore the rod 76 slides through the boss 78 in the clevis 79, this movement resulting merely in an additional compression of the spring 80.

During the normal operation of a railway train the adjacent coupled cars have an appreciable amount of movement with respect to one another. There is a longitudinal movement of the cars toward and away from one another as the train accelerates or decelerates. Likewise, there is an angular movement of the cars with respect to one another as the train makes turns or passes along curves in the track. This means that the centers of rotation of two cooperating switch blades on adjacent cars move toward and away from one another, and sideways of another, during the movement of the train. In order to maintain the switch blades in engagement with one another, as shown in Figure 1, during such movement, it is necessary that the blades have a freedom of motion about their respective pivotal centers. This is possible with the construction shown in Figure 5, since the blade of Figure 5 may be moved a substantial amount, clockwise, even though the crank 72 remains stationary. If the blade is forced in a clockwise direction by the cooperating switch blade of the adjacent car, it causes the crank 85 to rotate clockwise and to move the clevis 79, clockwise, against the action of the spring 80. This motion results in a compression of the spring 80 when the rod 76 is held by the stationary crank 72.

The switch 41 is mounted on the top disc portion 56 of the spindle 45. An insulator stack 90 is rigidly secured to the disc portion 56 and carries, at its upper end, an arm 91, on which is mounted, preferably, but not necessarily, resiliently, a switch blade or contact shoe 92. The bus 40 is secured to the arm 91 by means of a stud 93 that extends axially of the insulator stack and is rotatable with respect to the arm 91, so that upon rotation of the insulator stack, and with it the arm 91, the stud 93 may remain stationary. The circuit from the bus 40 is extended by way of the stud 93 and a flexible braided conductor 94 to the switch blade or contacting shoe 92.

The contact shoe 92 is secured to the arm 91 by means of a blade holder 95 which is swiveled to the arm 91 by means of a pivot pin 96. The pivotal connection of the blade and arm is optional. The contact shoe is secured to holder 95 in any preferred manner, as by means of bolts 97. A pair of springs 98—99 maintain the contacting face of the shoe 92 in a vertical plane while permitting a limited amount of tilting about the pin 96 as a center. It is to be understood that the present invention is not limited to this precise manner of mounting the contact shoe upon the switch arm 91. For other suitable forms of mounting, reference may be had to the pending application of Christen Christensen, Serial No. 504,502, filed December 24, 1930.

Reference may now be had more particularly to Figures 7 to 10, inclusive, showing the construction of the automatic transformer cut-out 45. The stationary contact 43 comprises a contact finger 110 that is secured to the bus 40 by means of a split clamp 111, and is adapted to be embraced by a pair of contact shoes mounted in a contact housing 114 secured to the switch arm 44. The contact shoes are spring pressed towards one another by means of springs 115, which press the contact shoes into firm engagement with the contact finger 110. The switch arm 44 is bolted or otherwise suitably secured to an insulator stack 117 that is rotatably mounted on the car roof. A terminal 118 is pivoted on the upper end of the insulator stack 117 about an axis coincident with the axis of rotation of the insulator stack, whereby, upon rotation of the insulator stack, the terminal 118 may remain stationary. The pivot comprises a pin 119 that extends through the terminal 118 and is secured at its upper and lower ends to the switch arm 44. To facilitate the turning of the switch arm with respect to the terminal 118, the switch arm is cut away at its mounted end. The terminal 119 is connected by a flexible braided conductor 120 to the contact shoes carried by the switch arm, and is connected, at its other end, to the conductor 46 that extends to the usual transformers within the car, as previously stated. It is thus apparent that by rotating the insulator stack 117 the switch arm may be moved to establish and disestablish a circuit between the transformer lead 46 and the bus 40.

The insulator stack 117 is mounted on a rotatable spindle 125 that extends through a barrel or shell 126 which is provided with a peripheral flange 127 that is bolted or otherwise secured to a flanged ring 128 that is welded to the car roof. The car roof is indicated at 129, and the line of weld between the ring 128 and the car roof is indicated at 130. The spindle 125 is supported at the upper end of the shell by means of a set of roller bearings 131, and is guided at its lower end by a set of bearings 132 also carried by the shell 126. An adjustable bearing nut 133 is threaded on the lower end of the spindle for tightening the lower bearing 132. At its upper end the spindle is provided with a disc portion 134 having a circular flange 135 that overhangs the top of the shell or barrel 126 and provides a closure against the entrance of moisture or other foreign matter into the bearings.

A torsion spring 140 surrounds the bearing shell and biases the spindle to its switch open position. At its upper end the torsion spring bears against the stationary structure, and at its lower end it bears against a spring ring 141.

The spring ring 141 is itself rotatable with respect to the spindle and is held against rotation by a locking lever 145 that is keyed to the spindle. The lower face of the spring 141 and the upper face of the locking lever 145 are provided with cooperating serrations, indicated at 146, for preventing relative rotation between the two when the spring ring is pressed against the locking lever.

The locking lever 145 carries a roller 150 at its outer end. When the switch is in its closed position, as shown, the roller 150 bears against a roller 151 carried by a latch 152 that is pivoted at 153 to the frame of a tripping electromagnet 154 which is bolted or otherwise secured to the stationary portion of the switch gear, as by means of a plate 155 that surrounds the shell 126, and is secured by the bolts that secure the shell in position.

When the switch is in its closed position, the spring 140 is under considerable stress and urges the spindle 125 towards its switch open position, that is, clockwise, as seen in Figure 8, and counter clockwise, as seen in Figure 9. The latch 152 prevents such rotation. It is to be noted that the center 160 of the roller 151 is above a center line drawn between the center 153 and the center of the roller 150, as seen in Figure 9. This means that the force of the spring 140, acting through the locking lever 145 upon the latch 152, tends to move the latch 152 inward, that is, clockwise about its pivot 153. An adjusting screw stop 161 limits the extent of such movement.

The latch 152 is adapted to be moved counter clockwise a small amount by the electromagnet 154. For this purpose the electromagnet is provided with an armature 165, pivoted at 153, and having an arm 166. When the armature 165 is attracted towards the core of the magnet 154, the arm 166 hits an adjustable screw 167 carried by the latch 152, and forces the latch about its pivot 153. It is to be noted that the latch 152 is in toggle with respect to the roller 150 carried by the locking lever 145. A movement of the latch 152 about its pivot 153 brings the knuckle of this toggle to the opposite side of a center line drawn between the center 153 and the center of the roller 150. Thereafter, the force of the spring acting through the latching lever 145 upon the roller 151 moves the latch 152 a further amount about its pivot 153, thus permitting the roller 150 to clear the roller 151 and to move with the locking lever 145 and the spindle 125 of the switch gear through an angle approximately 60 degrees to the switch open position. A spring bumper 169, carried by the armature frame, receives the locking lever 145 and stops the rotation of the switch gear without shock. While the switch is open the spring bumper 169 holds the locking lever 145 to thereby hold the switch against free movement under the vibration incident to movement of the railway car. The armature 165 is returned to the position shown in Figure 8 by a suitable spring, indicated at 170.

A similar spring biases the latch 152 to the position shown in Figure 9. An auxiliary switch 175 for opening the circuit of the trip coil to prevent draining of the battery and also, if desired, for signaling purposes, is rotatable with the locking lever 175 and cooperates with a pair of contact clips 176—177 controlling a signaling circuit for indicating the open or closed position of the automatic transformer cut-out switch. The transformer cut-out switch may be operated to its closed position in any desired manner, either manually or by suitable motor mechanism. The manual or motor operating connection may be made to the lever 145 or to any of the rotatable operating parts of the switch. The switch, however, is automatically tripped responsive to the energization of the tripping magnet 154. The tripping magnet may be connected in any desired circuit for energizing the same to trip the switch. One desired arrangement is to provide for energization of the tripping magnet 154 when the current flowing through the switch 45 to the transformer apparatus of the car exceeds a predetermined maximum.

From the description thus far given it is apparent that I have provided a switching arrangement whereby the power transformer and other electrical apparatus within the railway car maybe isolated from the bus at the top of the car while the car itself remains, electrically, a link in the power circuit of the train. In one embodiment of my invention the switch or trip coil is so wired that it can be opened before the trolley wire has been deenergized by opening the feeder or trolley wire circuit breaker.

Reference may now be had more particularly to Figures 11 and 12 showing a modified form of bus coupling switch, this switch corresponding to the switch 41 of Figures 1 and 2. The switch is here shown in its normal switch closed position. The blade is indicated at 200 and is pivoted on a blade holder 200a in the manner shown in Figure 6. The blade holder 200a is pivoted at 201 to a clevis 202 that is bolted or otherwise rigidly secured to the top of an insulator stack 203. A spring 204 biases the switch blade 200 about its pivot 201 towards a stop 205. In Figure 12 the switch blade 200 is shown somewhat out of engagement with the stop 205, being held in this position by a contacting blade 200' of a switch on an adjacent car of the train. The clevis 202 supports a terminal 206 that is pivoted between upper and lower arms of the clevis and about an axis coincident with the axis of rotation of the insulator stack. The terminal 206 is adapted to be connected to a bus corresponding to the bus 40. The rotatable insulator stack 203 is mounted on the head of a spindle 55', corresponding to the spindle 55 of Figure 4, which spindle is, in turn, journaled in a suitable shell 53' of a construction substantially similar to that of the shell 53 of Figure 4. The lower end of the spindle extends through the shell and has a worm wheel 210 keyed thereto, said worm wheel being in mesh with a worm 211 on a shaft 212 that also carries a worm wheel 213 in mesh with a worm 214 driven by a motor 215. The motor is suitably mounted upon the shell 53'.

It is to be noted that when the switch is in its closed position the blade has a freedom of motion about the pivot 201 under the action of the spring 204. To move the switch to the open position the motor 125 is energized to rotate the insulator stack 203 clockwise, as seen in Figure 12. This rotates the clevis 202 to rotate the pivot pin 201 of the switch blade holder 200a. After a very short amount of rotation of the clevis the stop 205 comes into engagement with the switch blade and thereafter causes the switch blade to move as a unit with the clevis 202. It is to be noted that the spring 204 maintains the blade against the stop and holds the blade against rattling or other movement due to vibration of the railway car incidental to the motion thereof. To close the switch, the motor is actuated in the reverse direction, thereby rotating the clevis 202 counter clockwise in the position shown in Figure 12. As the blade approaches its full closed position it may abut against a corresponding blade, such as a blade 200' of a switch on an adjacent car. Further movement of the clevis 202 to its full closed position merely results in the stop 205 moving away from the blade 200. The two blades of the two mating switches are then held in engagement by the spring pressure of the springs 204 of the respective switches. Thereafter, a relative movement of the two railway cars results in a relative movement of the two blades about their respective pivots 201 while maintaining contact between the blades. However, the insulator stacks 203 and the corresponding operating mechanisms remain stationary. In this embodiment of my invention there is a minimum number of parts moved to and fro as the railway cars move or turn with respect to one another.

Reference may now be had more particularly to Figures 13 to 16, inclusive, illustrating a modified form of mounting and actuating mechanism for the insulator stack such as the stack 90 of the switch 41 of Figures 1, 2 and 4. Insofar as the insulator supporting structure as shown in Figures 13 to 16 is the same as that shown in Figures 5 and 6, similar reference numerals have been used. The insulator stack is indicated at 90, being mounted upon the head or disc portion 56 of a spindle 55 that is journaled in a shell 53 provided with a mounting flange 53a for mounting on the roof of the railway car. A spring bearing plate or spring seat 241 is keyed to the lower end of the spindle, and is connected to the lower portion of a spring 242 that surrounds the shell 53. The spring is secured at its upper end to the mounting flange 53a as by means of a spring holder 243 and a bolt 244 that threads into one of the holes 244'. A plurality of holes are provided in order to permit adjustment of the tension of the spring. The spring is arranged to bias the mechanism to the switch closed position. In this respect the spring corresponds to the spring 89 of the switch 41 (Figures 4 and 5), and does not correspond to the torsion spring 140 of the switch shown in Figure 7.

The switch operating mechanism is mounted upon a bracket 245 that is secured to the flange 53a in any desired manner. A motor 246 is mounted upon the bracket 245 and is geared down through a worm gearing 247 to drive a shaft 248 which is coupled to a shaft 249 by means of a clutch 250. The shaft 249 is geared down, through suitable worm gearing 251, to drive a shaft 253 upon which is eccentrically mounted a cam 255. The cam 255 is adapted to bear against a roller 257 carried by a crank 258 that is secured to the spindle 55 in any desired manner. As shown, it forms an integral part of the spring seat 241. Of course, the spring seat and the crank 258 may be secured to the spindle 55 in any other desired manner, as, for example, in the manner shown in Figure 7, where the spring seat is held in position by the crank.

Figure 14:
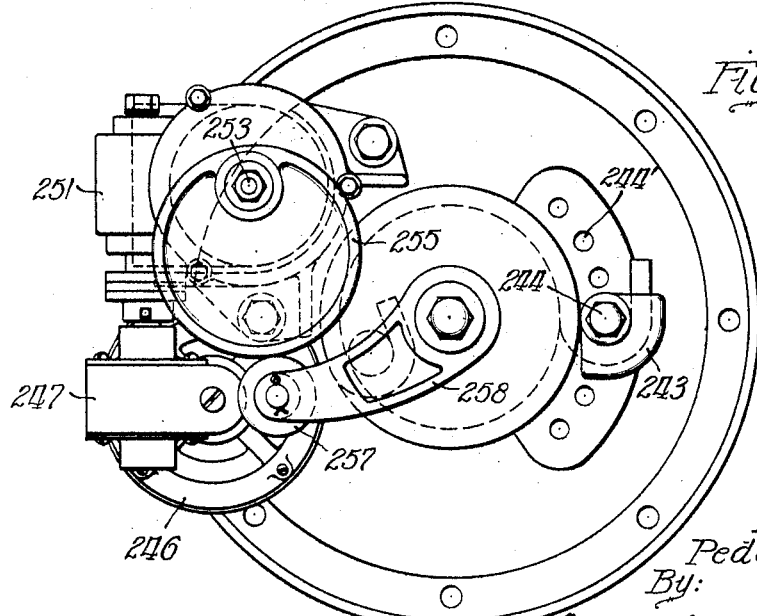
Figure 14 is a bottom view of the apparatus shown in Figure 13.

The switch is shown in its open position. At this time the spring 242 urges the spindle to rotate towards its switch closed position, such rotation being prevented by the crank 258 that bears against the cam 255. To actuate the switch to its closed position the motor 246 is operated to rotate the cam 255 through an angle of approximately 180 degrees. As the cam 255 turns about the pivot 253 the crank 258 is moved by the spring 242 in a generally clockwise direction as seen in Figure 14. This is a generally counter clockwise direction as seen in Figure 1. The switch blade turns until it abuts against a cooperating switch blade of the switch of an adjacent railway car. The cam 255 continues to operate through a small additional angle. The spindle 55 and the associated switch mechanism mounted thereon is free of the operating mechanism and may be moved a limited amount toward its switch open position by the movement of the blade of a mating switch. This merely results in a tensioning of the spring 242 and a movement of the crank 258 in a direction away from the cam 255. The motor mechanism and its associated gearing up to the cam 255 may therefore remain stationary while the switch blade and its supporting insulator and the spindle 55 is moved back and forth through a limited angle by the relative movement of the two coupled cars carrying the cooperating switches that are in engagement with one another.

To open the switch, the motor is actuated to turn the cam 255 through an angle of 180 degrees, thus returning it to the position shown in Figure 14. The cam 255 positively forces the crank back to the position shown in Figure 14, against the action of the spring, and positively moves the blade to its open position. The cam 255 holds the switch against swinging open under the jars and vibration incident to the travel of the railway car on which the switch is mounted.

Reference may now be had more particularly to Figures 17 and 18, wherein I show a pneumatic control for a bus coupling switch such as the switch 41 of Figure 1. The switch supporting insulator is mounted upon a spindle 55 in the same manner as was previously set forth, which spindle is journaled in a shell 53 that is secured to the car roof, also in the manner previously set forth. The spindle 55 extends through the shell and into a casing 300 that is secured to the shell 53 in any desired manner, as by bolting or the like. A T-shaped lever having three arms 301, 302 and 303, is keyed to the lower end of the spindle 55. The arm 303 comprises a locking arm for locking the mechanism in its switch open position, and for this purpose the arm is provided with a slot at its outer end, into which slot extends one end 310 of a locking latch 311 that is pivoted on a pin 312 and biased into its locking position by a spring 313. The pin 312 is carried by an arm 314. A spring seat 315 is pivoted about the same pin 312, and has a stud 316 threaded therein. A sleeve 317 slides over the stud and carries another spring seat 318 at its outer end. The spring seat 318 is pivoted to the arm 301 by a pin 319. A spring 320 extends between the spring seats 315 and 318 and urges them apart. When the switch is in its open position the mechanism is in the positon shown in Figure 18, and the spring 320 is under considerable compression.

The arm 302 carries a roller 325 at its outer end, said roller bearing against a piston 326 that slides in a cylinder 327. The piston and the cylinder comprise a pneumatic motor which receives air by way of an air inlet 328, and is adapted to operate the switch. A pneumatic motor 330 is provided for releasing the latch 311 to release the switch. An air inlet for the pneumatic motor is indicated at 331.

An explanation will now be given of the mode of operation of this mechanism. To operate this switch to its switch closed position, air pressure is applied to the motor 330. At this time no air pressure is applied to the motor cylinder 327. The piston or diaphragm of the motor 330 hits against the latch 311 and moves it out of engagement with the notch in the locking lever 303. The locking lever 303 is released, and since there is no pressure holding the piston 326 in the position shown in Figure 18 the spring 320 expands and rotates the arm 301 clockwise, as seen in Figure 18. At this time the sleeve 317 slides on the stud 316. The roller 325 moves the piston 326 downward within the cylinder 327. The spindle 55 of the switch mechanism is thus moved to its switch closed position. It is to be noted that there is a considerable compression on the spring 320, and therefore this spring would tend to close the switch with a violent bang. The cylinder 327 acts as a check to prevent such hammer action. A restricted vent 340 is provided in the cylinder 327 to permit a slow escape of air from the cylinder and thereby prevent a violent slamming of the switch. As long as it is desired to maintain the switch in its closed position no air pressure is applied to the motor 327. The air pressure on the motor 330 was applied only momentarily, since the latch 311 may be permitted to return to the position shown in Figure 18 after the switch has moved a small amount towards its closed position, as at that time the locking lever arm 303 is out of the path of movement of the latch 311. Thus no air pressure is necessary to maintain the switch in its closed position. The switch blade is maintained in its closed position by the spring 320, which also supplies the force for maintaining the necessary contact pressure between the contact shoes of the two switch blades of adjacent cars. To move the switch to its open position it is merely necessary to apply air pressure to the cylinder 327 for a moment. The air pressure forces the piston 326 outward of the cylinder to the position shown in Figure 18. This brings the locking arm 303 to the position shown in Figure 18. As the arm approaches its switch open position the beveled edge 345 thereof rides over the top of the locking latch 311 and forces it downwardly out of the way of movement of the arm 303. When the notch in the end of the locking arm 303 comes opposite the lug 310 of the latch, the latch is sprung into the notch by the spring 313. This locks the arm 303, and therefore locks the spindle 55 and the switch proper in the switch open position. The air pressure may then be released on air inlet 328. The piston 326 has sufficient frictional engagement with the cylinder wall to remain in its operated position even though there may be a considerable vibration incident to the travel of the railway car. If desired, this piston may be maintained against possible movement, due to vibration of the railway car, by the interposition of a suitable spring.

Reference may now be had more particularly to Figures 19 and 20, wherein I show a bus coupling switch, the operating parts of which are all mounted on the outside of and insulated from the car roof. The switch and its operating mechanism are mounted on a plate 360 mounted on three insulators 361 which in turn are mounted upon a triangular plate 362 that is supported by three similarly disposed insulators 361' mounted upon the roof 365 of the car. A bracket 366 is bolted or otherwise suitably secured to the plate 360 and extends upwardly therefrom. A blade support 368 is swiveled to the bracket 366 in any desired manner, as by means of a swivel bolt 369. The blade support 368 includes an integrally formed rearwardly projecting arm 370 that is adapted to be connected to the operating mechanism for swinging the blade support about the pivot pin 369. A blade 372 is mounted on the blade support in any desired manner, preferably to permit a limited amount of pivoting of the same about an axis at right angle to the pivot 369 and extending transversely of the railway car. The motor operating mechanism for this switch is supported by a bracket 375 that extends upwardly of the plate 360. The motor mechanism comprises a cylinder 376 which is swiveled to the bracket 375, as by trunnions 378—378 and cooperating arms 379—379 on the outside of the cylinder 376. A piston 380 moves within the cylinder, and has a piston rod 381 connected thereto and extending to a pivot 382 which connects the piston rod to the arm 370 of the switch blade support 368. A spring 385 within the operating mechanism biases the piston 380 to the position shown in Figure 19, which is the switch open position. To close the switch, air pressure is applied to the inside of the cylinder 376 by way of the pipe line 386. The piston 380 moves outwardly within the cylinder, against the action of the spring 385, and swings the blade to its closed position. A small vent 388 permits the escape of air from one side of the cylinder, thereby permitting the movement of the piston 380 by the air pressure applied to the other side of the piston. The switch blade 372 is maintained closed by the maintenance of air pressure on the working side of the piston. To open the switch the air pressure is released, at the same time opening a small passageway to the atmosphere, at the valve. This permits the spring 385 to return the piston 380 to the position shown in Figure 19. Also, even in the absence of any escape passageway in the valve that controls the air pressure to the pipe line 386, a release of the pressure will permit a sufficient escape or leakage of air by way of the space between the cylinder and the piston to allow the spring 385 to actuate the switch to its open position. Since the air can escape from the pressure side of the cylinder 376 only slowly, and can enter the other side of the cylinder very slowly through the restricted opening 388, the piston is cushioned against violent movement to the open position. A violent movement would otherwise take place due to the high compression of the spring. Even if the pressure side of the cylinder 376 is opened to the atmosphere when the switch is closed, the spring 385 will not open the switch violently. The restricted opening 362 prevents the rapid entrance of air into the cylinder, and therefore the movement of the piston to the position shown in the drawings is cushioned by the vacuum that is drawn on that side of the cylinder by the movement of the piston.

Reference may now be had to Figure 21, wherein I show a pneumatically operated switch mounted on top and outside of the railway car in a manner similar to that of the switch shown in Figures 19 and 20, and differing therefrom in that here the pneumatic pressure need not be maintained to keep the switch closed. Also, I have here substantially reduced the number of parts that move to maintain the contact between the two switch blades as the two adjacent coupled cars move relative to one another. In Figure 21 the switch is shown in its switch closed position. The mechanism is supported by a plate 400 that is mounted on three insulators 401 which are secured to the car roof in a manner similar to that of the insulators for the switch shown in Figures 19 and 20, that is, are mounted on a plate which in turn is mounted on three similar insulators on the car roof. A blade support is swiveled to the structure 400 at the swivel pin 405, and includes a blade supporting arm 406, an actuating arm 407, and a latching arm 408, all comprising one integral casting. The switch blade or contact shoe is indicated at 410, and is mounted on the arm 406, as by means of a pin 411 that permits turning of the shoe with respect to the axis of the pin 411. Suitable springs 413 hold the switch blade with its contact making face 414 vertical.

The switch operating mechanism comprises a pneumatic cylinder 425 having a piston 426 therein. A stud 427 is threaded into the end of the piston and extends into a tube or sleeve 428 within which it has free sliding movement. The sleeve 428 is connected to the actuating arm by means of a pivot pin 429. At its opposite end the sleeve 428 has a spring seat 431 secured thereto. A spring 432 bears against this spring seat and thus forces the sleeve 428 inward of the cylinder and against the piston 426. It is to be noted that the spring seat 431 is not mechanically connected to the piston 426 and that this spring seat and its associated sleeve or tube 428 is free to move away from the piston 426 upon the application of a force sufficient to compress the spring 432.

The switch blade is shown in Figure 21 in its extreme outward position. When the car upon which this switch is mounted is coupled to another car having a cooperating switch, the arrangement is such that the switch 410 engages the cooperating switch before the switch 410 reaches the extreme position shown in Figure 21, and it is held from reaching this extreme position by the cooperating switch blade. This means that when the blade 410 engages a cooperating blade it will be in a position moved clockwise a few degrees about the pivot 405. The spring 432 exerts a continuous force against the spring seat. Through the tube 428, and the arm 407, it urges the switch blade counterclockwise about its pivot 405. Hence, the pressure of the spring 432 will be available for maintaining a firm contact pressure between the contacting faces of the cooperating switch blades. As the two coupled cars move with respect to one another, the blade 410 moves about its pivot 405 under the action of the spring 432 which acts to always maintain the two blades in engagement. At such time the tube 428 slides on the stud 427, whereby the piston 426 may remain stationary. The piston remains stationary due to its frictional engagement with the cylinder wall.

To actuate the switch to its open position, air pressure is applied to the working side of the piston, as by means of a pipe line, indicated at 435. This forces the piston outward within the cylinder and, through the pipe 428, causes the switch blade to swing, clockwise, about the pivot 405. As the blade approaches its full open position the arm 408 engages a latch 440. The latch is pivoted to the structure 400 by means of a pin 441, and is biased to its locking position by means of a spring 442. The arm 408 forces the latch about its pivot 441. When the end of the arm 408 comes under the locking face 443 of the latch, the latch springs back to its normal position, under the action of the spring 442, and locks the arm 408 against retraction by the spring 432. This positively locks the switch blade in its open position. The air pressure may then be released from the cylinder 425.

A pneumatic motor 445 is provided for actuating the latch 440 to its released position to permit the switch to move to its closed position under the action of the spring 432. When pressure is applied to the motor 445 a plunger 446 moves the latch 440 about its pivot 441 to the switch releasing position. Since, at this time, there is no pressure applied to the piston 426 by way of the pressure connection 435, the spring 432 commences to move the switch blade to its closed position. A moment later the arm 408 is free of the latch 440 and thereafter the pressure may be released from the pneumatic motor 445. A restricted vent opening 450 is provided for the cylinder 425 on the working side of the piston 426. This restricts the rate at which air can leave the cylinder. At the same time a vacuum is drawn on the other side of the piston. The action of the vacuum on one side of the piston and the pressure on the other side of the piston due to the restricted opening 450 provides a cushion for preventing a slamming of the switch to its closed position by a hammer action of the very powerful spring 432.

In the event that it is desired to close the switch shown in Figure 21 it is only necessary to release the latch 440. The spring 432 does the rest. If the car on which the switch is mounted has remained disconnected from a source of electric power for an appreciable period of time, as over night, there may be no compressed air available for operating the switch. An operator need only, therefore, manually trip the latch 440 to close the switch 410. The switch will not close with a violent bang, for the reasons pointed out above.

In Figure 21A I have shown an alternate arrangement for accomplishing the results accomplished by the switch mechanism shown in Figure 21. The switch blade pivots about a pivot 405, to which pivot is also mechanically connected a crank 460. The mechanism shown in Figure 21A is mounted directly on top of the car, as in the case of Figure 21, and the blade is connected to swing about the pivot 405. If the mechanism shown in Figure 21A is mounted below the car roof, then the pivot 405 would correspond to the spindle 55 of Figure 4, which spindle supports the switch through an insulator. The mechanism illustrated in Figure 21A is shown in its normal switch open position. A lever 461 is pivoted about a stationary pivot 462 and is urged in a counter-clockwise direction by a spring 463 that extends between the lever 461 and a stationary point 465. A pivoted latch 466 holds the lever 461 against swinging under the action of the spring 463. A spring 467 connects the upper arm of the lever 461 with the crank 460. The connection between the lever 461 and the bell crank 460 may be similar to that between the lever 82 and the crank 72 of Figure 4. Such connection would include a rod pivoted to the lever 461 and having sliding engagement with respect to the crank 460 so as to permit sliding of the rod to the left, as seen in Figure 1, without affecting the crank. However, a movement of the rod to the right, as in Figure 21, will positively move the crank to the position shown in this figure.

The lever 461 is provided with an actuating arm 470 that is adapted to be actuated by a pneumatic motor 471 having an air inlet 472. A dashpot is provided for retarding the action of the lever 461, said dashpot comprising a piston 473 riding in a cylinder 474.

When it is desired to close the switch it is merely necessary to trip the latch 466. This may be done manually. The spring 463 is under considerable compression and therefore forces the lever 461 counter-clockwise about the pivot 462. The spring 467 moves the crank 460 counter-clockwise to its switch closed position. At this time no air is applied at the inlet 472 of the pneumatic motor 471, and therefore the movement of the arm 470 under the action of the spring 463 produces a compression in the cylinder 471, which serves to prevent a violent movement of the lever 461 under the action of the very powerful spring 463. At the same time the piston 473 draws a vacuum in the cylinder 474, which further serves to cushion the movement of the lever 461. When the switch is in its closed position the arm 460 has a limited permissible movement in a counter-clockwise direction, as seen in Fig. 21A. It also has complete freedom of movement in a clockwise direction, against the action of the spring 467. It is to be noted that the spring 463 is by far more powerful than the spring 467 and therefore the lever 461 remains stationary as the crank 460 is being moved by the action of the cooperating switch blade on the adjacent railway car. Such movement of the crank 460 produces additional compression in the spring 467. Since the lever 461 remains stationary, there is no continuous wear on the lever bearing 462.

To open the switch, air pressure is applied to the motor 471 to move the piston thereof to the position shown in Figure 21A. This positively forces the lever 461 back to the position shown in the drawings and compresses the powerful spring 463. As the lever reaches its full closed position it is engaged by the latch 466 and thus held in the closed position. The compression on the spring 463 is thereby retained so as to permit closing operation of the switch, at a future time, even through no air pressure may be available at that time.

While I have herein shown the pneumatic operating mechanisms of Figures 19 and 21 as mounted on top of the car roof, it is within the purview of the present invention to mount these mechanisms within the vestibule hatch, as in the case of the mechanisms previously described. Under such circumstances the switch blade would be insulated from the operating mechanism by an insulator as shown in Figure 1, and the mechanism would rotate a spindle such as the spindle 55 of Figures 4 or 17, which spindle comprises a support for the rotatable insulator upon which the blade is mounted. If desired, pneumatic mechanisms shown in Figures 19 and 21 may be arranged to operate a switch such as is shown in Figures 13 and 14, the pneumatic mechanism rotating the cam 255 of Figure 14. Also, a pneumatic mechanism may replace the electric motor and gearing of Figure 11.

Reference may now be had more particularly to Figures 22 to 25, wherein I have shown an arrangement for manually operating a bus disconnect switch such as was previously described. Before proceeding with a description of Figures 22 and 23, which show the driving connection for the switch, it may be well to describe the operating connection to the switch itself, insofar as this operating connection is different from the operating connection in the case of a motor driven switch. For this purpose, reference may be had more particularly to Figures 24 and 25. The mounting for the switch proper is similar to that of Figures 13 through 16, differing therefrom in that the motor mechanism and speed reducing gearing of Figures 13 to 16 have been omitted. The parts of Figures 24 and 25 that correspond with parts of the mechanism shown in Figures 13 to 16 have been indicated by corresponding reference numerals. The switch supporting shell is indicated at 53 and comprises a journal support for the spindle 55. The portions of the shell and spindle above the broken line of Figure 24 are of a construction identical to that shown in Figure 16. A collar 500 is keyed to the lower end of the spindle 55 and has a circular boss 501 extending upwardly therefrom and comprising a seat for the lower end of the spring 242. The collar 500 has a cylindrical portion 502 upon which is mounted a crank 503. The crank is held in place against downward sliding by a plate 504 and a bolt 506. The crank is freely rotatable about the cylindrical portion of the collar without producing a corresponding rotation of the collar. A stud 508, which is an integral part of the collar 500, abuts against the crank 503 and prevents rotation of the collar by the spring 242 as long as the crank is held against rotation. A connecting rod 510 is connected to the end of the crank 503 by means of a clevis 511 and a pin 512. The switch supporting mechanism of Figures 24 and 25 is in its normal switch open position. At this time the spring 242 is under tension, and it tends to rotate the collar 500 in a direction clockwise as seen in Figure 25.

To close the switch, the crank is moved in a direction clockwise as seen in Figure 25. This permits the spring to rotate the collar 500, and thereby rotate the spindle 55. It is to be noted that the crank 500 does not move the switch to its closed position. It merely permits the spring 242 to move the switch. When the crank has been rotated through an angle approximately 45 degrees, the switch blade will abut against the cooperating blade of the switch of the adjacent railway car, and will thereby be held against further rotation, as was previously set forth. The crank 503 may then be rotated an additional few degrees and then locked in position, as will be set forth presently. The switch now has a complete freedom of motion, even to its ultimate full open position, without interference by the crank. If it is desired to manually open the switch it is only necessary to actuate the connecting rod 510 to positively rotate the crank 503 back to the position shown in Figure 25.

Reference may now be had to Figures 22 and 23 for an explanation of the mechanical driving connection to the connecting rod 510. In Figures 22 and 23 I have shown the end of a conventional type of railway car. The vestibule of the car is shown at 15, the vestibule hatch at 16, as was previously set forth, the door leading from the vestibule to the outside of the car is indicated at 520, and the door leading from the vestibule into the car proper is indicated at 521. At 522 is indicated a passageway that leads through the usual bellows arrangement into the next car. The usual construction of railway car is such as to provide a space 523 in the vestibule. I propose to mount the hand operating mechanism in the corner 524 of this space. The connecting rod 510 connects with a rod 530 by means of a crank 531, so that rotation of the rod 530 produces an actuation of the connecting rod 510. The operating mechanism is indicated at 532 and contains step-down gearing which may be actuated by a hand wheel or crank 534 to rotate the rod 530. The preferred arrangement is such as to produce a mechanical advantage between the crank or hand wheel 534 and the rod 530, so that the force required at 534 is only a portion of the force that would otherwise be required to turn the rod 530 in the switch opening direction. This is preferable, although not indispensable. Any suitable form of gearing may be located in the mechanism 532.

The spring 242 that urges the switch in its closing direction is of considerable tension, and therefore a considerable force must be applied to the connecting rod 510 to move the switch to its open position, since such movement is against the action of the spring 242. I propose to provide a counter-balancing spring for assisting during the switch opening operation, and thereby reduce the amount of effort necessary to open the switch. The counter-balancing spring is, preferably located within the mechanism 532.

Reference may now be had more particularly to Figure 26 showing one form of operating mechanism 532. The rod 530 extends into a gear housing 540 within which the gearing is mounted. I have here shown a beveled gear drive, although it is to be understood that any other preferred form of gearing may be used, including a ratchet as well as a worm gear drive. The crank or hand wheel 534 drives a shaft 545, on which is keyed a bevel gear 546, which in turn drives a larger bevel gear 547 at a reduced speed. The gear 547 is keyed to the shaft 530 for rotating the same. A locking device is provided for locking the gear 546 against rotation, and thereby locking the shaft 530. This device comprises a toothed wheel 550 keyed to the bevel gear 546 and held against rotation by a spring pressed plunger 551. The plunger may be retracted from engagement with the teeth on the wheel 550 to permit operation of the mechanism, and may be latched in its disengaged position to permit unimpeded manual operation of the member 534.

In order to reduce the amount of effort necessary to open the switch, I provide a counterbalancing spring as indicated at 555. The upper end of the spring is secured to a collar 556 that is keyed to the shaft 530, whereby the upper end of the spring must turn with the shaft 530. The lower end of the spring is held in place by the stationary structure 540. The spring 555 preferably is of approximately half, or slightly more than half, the tension of the spring 242, so that half as much effort is required to turn the spring 555 through a given angular distance than is required to turn the spring 242 through the same distance. The arrangement is such that when the shaft 530 is in its normal switch open position the spring 555 is unstressed. When the shaft is rotated in its switch closing direction the spring 555 is being wound up, whereas when the shaft is rotated in the opposite direction, that is, in the switch opening direction, the spring 555 is unwinding and doing work.

An explanation will now be given of the operation of the hand operating mechanism, in order to afford a clearer understanding of the cooperation between the spring 555 of the operating mechanism and the spring 242 of the switch. Assume that the switch is in its normal switch open position. At this time the spring 242 is under stress, that is, it is wound up, whereas the spring 555 is unwound. When it is desired to operate the mechanism to close the switch, the handle 534 is operated to turn the rod 530 in the proper direction. At this time the spring 555 is being wound up, whereas the spring 242 is, in effect, unwinding. Since the spring 242 is twice as stiff as is the spring 555 it is apparent that the spring 242 is capable of turning the mechanism, that is, of turning the crank 503 through the stop 508. This turning action is under the control of the handle 534, so that the operator must hold the mechanism back by a force somewhat proportionate to the difference in tension of the two springs, minus the friction in the various parts. The holding force that must be exerted by the operator is appreciably less than would be required in the absence of the spring 555. After the switch blade reaches its limiting position, as determined by the blade on the adjacent railway car, the spring 242 is held against further action and the operator therefore turns the handle 534 a small additional amount. This turning produces an additional tensioning of the spring 555, although this additional tensioning is not of very great consequence insofar as concerns the essential operation of the mechanism. The operator then releases the locking device 551 to thereby hold the shaft 530 in position and thus retain the tension on the spring 555. The switch now operates in the manner previously set forth, the spring 555 being of no effect on the switch. This spring comes into particular action when it is desired to open the switch.

When it is desired to open the switch the locking member 551 is released, and the member 534 is operated to turn the shaft 530, through the gearing shown, to its switch open position. At this time the spring 242 is being wound up, and, in the absence of the spring 555 the operator would have to exert a considerable effort on the handle 534. However, it is to be noted that at this time the spring 555 is being unwound, and therefore the force of the spring 555 assists the operator in moving the mechanism to its open position and overcoming the tension of the spring 242. This substantially reduces the amount of effort required of the operator.

From the description thus far given it is apparent that I have provided an arrangement wherein the full power of the spring 242 is utilized for maintaining the contact pressure between the two switch blades, whereas only half of the tension of the spring need be overcome to move the switch to its open position or to prevent the violent closing of the switch under the action of this spring. It is also to be noted that while I have herein shown one particular form of gear drive, any other gearing arrangement may be used. Furthermore, while I have herein shown the gearing mechanism 532 located in the corner 534 (Figure 23), it is to be understood that this mechanism may be located at any other suitable place, for instance, it may very well be located in the opposite corner of the vestibule, that is, in the corner indicated at 560, between the passageway 522 and the window 561, usually provided.

In Figures 27 and 28 I show an endless rope drive for the lever 503 of the switch of Figures 24 and 25. The rope 565 comprises a loop and is attached to the lever 503 and passes over pulleys 566 and downward into the mechanism shown in Figure 28. The mechanism shown in Figure 28 comprises a drum 568 within a casing 569. The rope 565 is wound around the drum. A clock spring 570 is located within the drum and corresponds to the spring 555 of Figure 26. The drum is actuated by means of the hand wheel 534 to actuate the switch in a manner substantially similar to that previously described. The spring pressed locking member 575 holds the drum against rotation and thereby holds the switch in its open position against the action of the spring 242 or, when the switch is closed, retains the tension on the spring 570. It is believed that the action of this spring will be apparent from the description previously given in connection with the spring 555 as of Figure 26.

Figure 15:
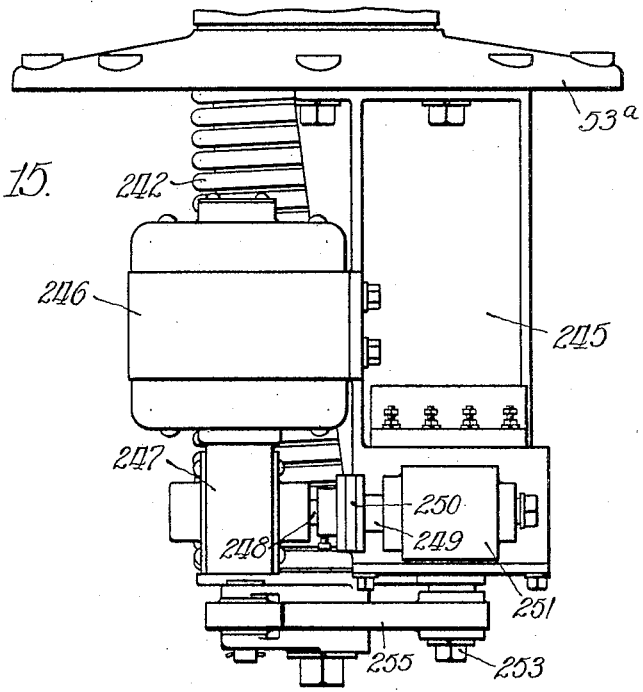
Figure 15 is an end view taken along the line 15—15 of Figure 13.
Figure 16:
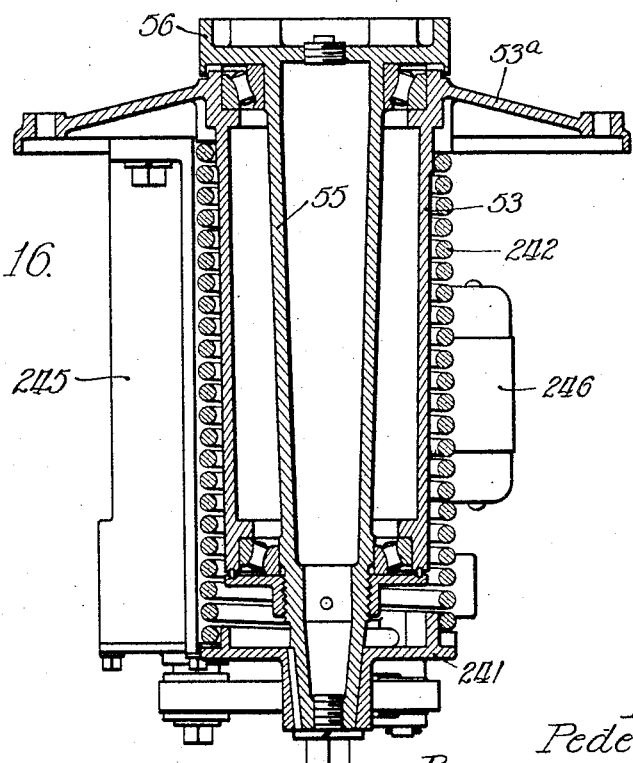
Figure 16 is a sectional view taken along the line 16—16 of Figure 13.

While I have herein shown a hand operating mechanism used in connection with a switch such as is shown in Figures 13 to 15, that is, in connection with a switch of the type wherein the closing action is obtained by a spring, rather than by a positive drive, it is apparent that the manual mechanism is applicable to a switch wherein a positive drive is necessary in the closing direction as well as in the opening direction. Such a switch is shown, for instance, in Figures 11 and 12. In this case the tension of the spring 204 is not encountered during the switch closing operation until a substantial part of the closing movement has been made. However, the principle of action is the same.

In connection with the rope drive attention is called to the fact that by the use of suitable pulley arrangements, known in the art, any desirable mechanical advantage may be obtained, whereby the operator need exert only a small amount of force to overcome the comparatively large force of the spring that tends to move the switch to its switch closed position.

Attention is also called to the fact that a blade mounting such as is shown in the switch of Figures 11 and 12 may be used in connection with any of the other operating mechanisms described in connection with the various bus coupling switches herein shown.

In compliance with the requirements of the patent statutes I have herein shown and described a few preferred embodiments of my invention. It is, however, to be understood that the invention is not limited to the precise arrangement herein shown, the same being merely illustrative of the principles of the invention.

What I consider new and desire to secure by Letters Patent is:

1. An electric connecter comprising a bearing support, an axially rotatable member mounted on said support, circuit making means mechanically connected to and actuated by said rotatable member, and means for rotating said member to actuate the circuit making means, said last means being mechanically connected with said rotatable member, and including a spring for rotating the member in one direction and a motor for rotating it in the reverse direction and storing energy in said spring for subsequent operation in said one direction.

2. An electric connecter comprising a bearing support, an axially rotatable member mounted on said support, circuit making means mechanically connected to and actuated by said rotatable member, and means for rotating said member to actuate the circuit making means, said last means being mechanically connected with said rotatable member, and including a spring for rotating the member in one direction and a motor for rotating it in the reverse direction and storing energy in said spring for subsequent operation in said one direction, and including also a pneumatic cylinder and piston for retarding the rate of motion of the switch under the action of the spring.

3. A connecter comprising a support, insulator supporting means rotatably mounted on and extending axially of said support, an insulator mounted on said supporting means, a contact making member mounted on the insulator, driving means for actuating the insulator supporting means in one direction and permitting overtravel of the insulator supporting means independent of movement of the driving means, and means biasing the insulator supporting means against overtravel with respect to the driving means and to a position limited by the position of the driving means, said biasing means being resilient to permit a movement of the insulator supporting means in one direction from the position limited by the driving means.

4. In combination, a mounting member comprising a hollow shell having a mounting flange extending therefrom, an insulator supporting spindle extending into said shell and journaled therein, spring means biased between said shell and said spindle normally urging said spindle in one direction, and means carried by said mounting member and connected to said spindle for actuating the same in the opposite direction.

5. A mounting member for mounting a circuit controlling device on the roof of a structure, comprising a mounting flange adapted to be mounted on the roof of the structure, a hollow shell depending from the flange, bearing means in said shell, a supporting spindle extending into said shell and journaled in said bearing means, spring means biased between said member and said spindle normally urging said spindle in one direction, and means carried by said mounting member and connected to said spindle for actuating the same in the opposite direction.

6. A mounting member for mounting a circuit controlling device on the roof of a structure, comprising a mounting flange adapted to be mounted on the roof of the structure, a hollow shell depending from the flange, bearing means in said shell, a supporting spindle extending into said shell and journaled in said bearing means, spring means urging the spindle to rotate in one direction in said shell, stop means for limiting the rotation of the spindle under the action of the spring, said spindle being rotatable away from the stop means against the action of the spring, and motor means for moving the stop means to positively turn the spindle against the action of the spring.

7. A mounting member for mounting a circuit controlling device on the roof of a structure, comprising a mounting flange adapted to be mounted on the roof of the structure, a hollow shell depending from the flange, bearing means in said shell, a supporting spindle extending into said shell and journaled in said bearing means, spring means urging the spindle to rotate in one direction in said shell, and movable stop means for limiting the rotation of the spindle under the action of the spring, said stop means being movable to permit the spring to actuate the spindle from one normal circuit controlling position to another normal circuit controlling position.

8. A connecter including a movable member, circuit controlling means connected thereto, a movable stop, spring means urging the movable member towards the stop, said member being movable away from the stop against the action of the spring means, and means for actuating the circuit controlling means comprising means for moving the stop whereby the spring moves the circuit controlling means.

9. A connecter having a bearing shell comprising a support, bearings at the upper and lower ends of the shell, a spindle extending through said shell and journaled in said bearings, an insulator mounted on said spindle, spring means surrounding said shell and connected to the spindle for biasing the spindle to a given radial position in the shell, means having abutting connection with said spindle for holding the same in a different radial position in the shell against the action of the spring, said last named means being movable to permit a return of the spindle to its given position under the action of the spring.

10. A connecter including a hollow shell, mounting means therefor, bearing means in said shell, a spindle supported by and journaled in said bearing means, said spindle extending from said shell into the open atmosphere and having supporting means on the outward extending portion thereof including an arm extending radially outward of the spindle, a circuit making member mounted on the arm and having a relatively long narrow contact making face, spring means urging the arm angularly to a predetermined position, means retaining said arm against turning, and means mounted on the shell and mechanically connected to the spindle for actuating the circuit making member.

11. A connecter comprising a hollow shell, a spindle journaled in said shell, contact making means connected to and actuated by the spindle, spring means connected to one end of said spindle for urging the spindle to a predetermined angular position in said shell, latching means retaining the spindle against turning under the action of the spring means, and trip means for the latching means.

12. An electric connecter including a support, a bearing shell extending therefrom, a spindle journaled within said shell, a circuit controlling member supported at one end of the spindle, a crank supported at the other end of the spindle, cam means having abutting engagement with said crank for moving the crank in one direction, and spring means biased between said bearing shell and said spindle for urging said crank towards said cam for moving the circuit controlling member in the opposite direction.

13. In combination with an electric connecter, means for operating the connecter in one direction comprising a pneumatic motor, spring means for operating the connecter in the reverse direction, said first named means including telescoping means within said motor providing for movement of the connecter in one direction against the pressure of said spring means when said pneumatic motor is inoperative.

14. An electric connecter including spring means urging the connecter to its closed position, spring means urging the connecter to its open position, and means for disabling the second mentioned spring means when the connecter is closed whereby the full effect of the first mentioned spring means is available for holding the connecter closed.

15. In combination, a supporting plate member, a housing secured to and extending therethrough, a rotatable insulator having a bearing spindle supported in said housing, a contact-making member carried by said insulator on one side of said plate member and rotatable into and out of operative position upon rotation of said spindle, spring means on the opposite side of said plate member biased between said housing and said spindle and normally urging said spindle into operative position, and means engaging the lower end of said spindle for rotating said spindle to retract said contact-making member out of operative position against said spring pressure.

16. In combination, a supporting plate member, a housing secured to and extending therethrough, a rotatable insulator having a bearing spindle supported in said housing, contacting means carried by said insulator on one side of said plate member and rotatable into and out of operative position upon rotation of said spindle, spring means on the opposite side of said plate member biased between said housing and said spindle and normally urging said spindle into operative position, and motor driven means engaging the lower end of said spindle for rotating said spindle to retract said contacting means out of operative position against the pressure of said spring means.

17. In combination, a supporting member, a housing secured to and extending therethrough, an insulator having a bearing spindle rotatably supported in said housing, contact means carried by said insulator on one side of said supporting member and rotatable into and out of contacting position upon rotation of said spindle, spring means on the opposite side of said supporting member biased between said housing and said spindle normally urging said spindle into contact-making position, and manually operable means engaging the lower end of said spindle for rotating said spindle to retract said contact means out of operative position against the pressure of said spring means.

18. In combination, supporting means, a housing secured to and extending therethrough, an insulator having a bearing spindle rotatably supported in said housing, contact means carried by said insulator on one side of said supporting means and rotatable into and out of operative position upon rotation of said spindle, spring means on the opposite side of said supporting means biased between said housing and said spindle and normally urging said spindle into operative position, and pneumatically operable means engaging the lower end of said spindle for rotating said spindle out of operative position against the pressure of said spring means.

19. In combination, supporting means, a housing secured to and extending therethrough, an insulator having a bearing portion rotatably supported in said housing, contacting means carried by said insulator on one side of said supporting means and rotatable into and out of operative position upon rotation of said spindle, spring means on the opposite side of said supporting means biased between said housing and said spindle normally urging said contact means into operative position, means engaging the lower end of said spindle for rotating said spindle out of operative position against the pressure of said spring means, and latching means for maintaining said contacting means in inoperative position against said spring means.

20. In combination, supporting means, a housing secured to and extending therethrough, an insulator having a bearing spindle rotatably supported in said housing, contacting means carried by said insulator on one side of said supporting means and rotatable into and out of operative position upon rotation of said spindle, spring means on the opposite side of said supporting means biased between said housing and said spindle normally urging said spindle and contacting means into operative position, pneumatically operable means engaging the lower end of said spindle for rotating said spindle and contacting means out of operative position against the pressure of said spring means, latching means for maintaining said contacting means in inoperative position, and pneumatically operable means for releasing said latching means to provide for movement of said spindle and contacting means into operative position by the pressure of said spring means.

21. In combination, supporting means, a housing secured to and extending therethrough, an insulator having a bearing spindle rotatably supported in said housing, contacting means carried by said insulator on one side of said supporting means and rotatable into and out of operative position upon rotation of said spindle, spring means on the opposite side of said supporting means biased between said housing and said spindle normally urging said spindle and contacting means into operative position, means engaging the lower end of said spindle for rotating said spindle to retract said contacting means out of operative position against the pressure of said spring means, latching means for maintaining said contacting means in retracted position, and means for releasing said latching means to provide for automatic movement of said contacting means into operative position under the influence of said spring means.

22. In a device of the class described for supporting a circuit connecter on a vehicle roof, a mounting member, a spindle rotatable in said member and having a radially extending arm, a contact-making member mounted on said arm and rotatable axially of itself with respect to said arm, spring means for maintaining said contact-making member in predetermined position, means for latching said spindle in position whereby said contact-making member is retracted out of operative position, spring means tending to force said spindle in a direction to move said contact-making member into operative position, and means for retracting said spindle into latched position against the pressure of said last-named spring means.

23. A connecter comprising a support, insulating supporting means rotatably mounted therein, a contact-making member mounted on said supporting means, means for rotating said supporting means into retracted position, and means including a resilient spring biased between said support and said supporting means for urging said supporting means into operative position, said rotating means having lost motion connection with said supporting means to accommodate variations in the operating position of said contact-making member, said variations being limited by said spring biased means to provide for return of said supporting means to retracted position upon operation of said rotating means.

24. A connecter comprising a support, a rotatable spindle mounted in said support and having projecting end portions, an insulator mounted on one end of said spindle, a contact member carried by said insulator, spring means biased between said support and said spindle for rotating said spindle into contact-closing position, and means engaging the opposite end of said spindle for rotating said spindle into contact-opening position, said engagement between said rotating means and said spindle providing for limited movement of said spindle in its contact-closing position to accommodate variations in position imposed upon said contact member.

25. A connecter comprising a hollow supporting member, a rotatable spindle mounted therein, an insulator carried by said spindle and having contact connecter means thereon, spring means biased between said supporting member and said spindle for rotating said spindle in one direction, manually operable means connected to said spindle for rotating the same in the opposite direction against the tension of said spring means, and means operative upon actuation of said manually operable means tending to rotate said spindle in said opposite direction to reduce the effective tension of said spring means.

PEDER B. HOYE.